US006975997B1

(12) United States Patent
Murakami et al.

(10) Patent No.: US 6,975,997 B1
(45) Date of Patent: Dec. 13, 2005

(54) METHOD FOR EFFICIENT VEHICLE ALLOCATION IN VEHICLE SHARING SYSTEM

(75) Inventors: Hiroshi Murakami, Saitama (JP); Shunji Yano, Tochigl (JP); Kazuhiro Nakamura, Tokyo (JP); Matthew James Barth, Riverside, CA (US); Michael Donovan Todd, Redlands, CA (US)

(73) Assignees: Honda Giken Kogyo Kabushiki Kaisha, Tokyo (JP); The Regents of the University of California, Oakland, CA (US)

( * ) Notice: Subject to any disclaimer, the term of this patent is extended or adjusted under 35 U.S.C. 154(b) by 311 days.

(21) Appl. No.: 09/607,523

(22) Filed: Jun. 28, 2000

Related U.S. Application Data

(63) Continuation-in-part of application No. 09/349,049, filed on Jul. 7, 1999.

(51) Int. Cl.[7] .............................................. G06F 17/60
(52) U.S. Cl. ......................................................... 705/5
(58) Field of Search ............................................. 705/5

(56) References Cited

U.S. PATENT DOCUMENTS

| | | |
|---|---|---|
| 1,223,258 A | 4/1917 | Cooper |
| 3,624,608 A | 11/1971 | Altman et al. |
| 3,655,397 A | 4/1972 | Di Napoli et al. |
| 3,742,453 A | 6/1973 | Polylo |
| 3,754,122 A | 8/1973 | Di Napoli et al. |
| 3,757,290 A | 9/1973 | Ross |
| 3,858,775 A | 1/1975 | Haas |
| 3,906,447 A | 9/1975 | Crafton |
| 3,997,044 A | 12/1976 | Schasser |
| 4,072,859 A | 2/1978 | McWaters |

(Continued)

FOREIGN PATENT DOCUMENTS

| | | |
|---|---|---|
| CA | 2 227 664 | 7/1998 |
| DE | 38 05 810 | 9/1989 |
| DE | 40 24 186 A1 | 2/1992 |
| DE | 40 24 186 | 2/1992 |
| DE | 42 27 969 | 3/1994 |
| DE | 42 27 969 A1 | 3/1994 |
| DE | 43 01 039 | 7/1994 |
| DE | 44 29 852 | 2/1996 |
| DE | 195 08 369 | 3/1996 |
| DE | 195 08 370 | 9/1996 |

(Continued)

OTHER PUBLICATIONS

Matthew Barth, et al., Performance Evaluation of a Multi-Station Shared Vehicle System, 2001 IEEE Intelligent Transportation Systems Conference Proceedings, Aug. 25–29, 2001, pp. 1218–1223.*

Cathy Lang Ho, Pooled Cars, Architecture, vol. 89, Iss. 10, Oct. 2000, p. 76.*

Car-Sharing Could Be Answer to Traffic Chaos One Measure Which Would Help Alleviate Dublin's Traffic Problems Seems Almost Too Good to Be True. Frank McDonald, Env'l Corr., Explains How It Is Working In Many Other Cities, Irish Times, Sep. 1, 1999, p. 9.*

(Continued)

*Primary Examiner*—Richard Chilcot
*Assistant Examiner*—J Harle
(74) *Attorney, Agent, or Firm*—Fish & Richardson P.C.

(57) ABSTRACT

A system for sharing a fleet of vehicles among a plurality of users, where in preferred embodiments the shared vehicles are electrically powered, the system comprising a system control computer that assigns vehicles in response to requests by users, and monitors system performance, a computer subsystem through which users request vehicles for trips, and a vehicle subsystem within each vehicle that is in communication with the system control computer allowing the system control computer to monitor the location and status of each vehicle in the vehicle sharing fleet.

9 Claims, 14 Drawing Sheets

U.S. PATENT DOCUMENTS

| | | | |
|---|---|---|---|
| 4,353,055 A | 10/1982 | Kawakatsu et al. | |
| 4,360,875 A | 11/1982 | Behnke | |
| 4,438,426 A | 3/1984 | Adkins | |
| 4,495,484 A | 1/1985 | Kawakatsu et al. | |
| 4,620,429 A | 11/1986 | Quillen | |
| 4,692,762 A | 9/1987 | Lewiner et al. | |
| 4,719,460 A | 1/1988 | Takeuchi et al. | |
| 4,776,003 A | 10/1988 | Harris | |
| 4,777,646 A | 10/1988 | Harris | |
| 4,994,714 A | 2/1991 | Hoekman et al. | |
| 5,066,034 A | 11/1991 | Carr | |
| 5,066,853 A | 11/1991 | Brisson | |
| 5,168,451 A | 12/1992 | Bolger | |
| 5,206,643 A | 4/1993 | Eckelt | |
| 5,265,006 A | 11/1993 | Asthana et al. | |
| 5,289,369 A | 2/1994 | Hirshberg | |
| 5,337,046 A | 8/1994 | Grasset | |
| 5,357,143 A | 10/1994 | Lehr et al. | |
| 5,366,338 A | 11/1994 | Mortensen | |
| 5,493,694 A | 2/1996 | Vlcek et al. | 455/53.1 |
| 5,539,399 A | 7/1996 | Takahira et al. | |
| 5,557,254 A | 9/1996 | Johnson et al. | |
| D374,208 S | 10/1996 | Eva, Jr. | |
| 5,579,973 A | 12/1996 | Taft | |
| 5,604,676 A | 2/1997 | Penzias | |
| 5,612,608 A | 3/1997 | Ishiguro et al. | |
| 5,614,804 A | 3/1997 | Kayano et al. | |
| 5,664,113 A | 9/1997 | Worger et al. | |
| 5,686,895 A | 11/1997 | Nakai et al. | |
| 5,717,387 A | 2/1998 | Suman et al. | |
| 5,721,550 A | 2/1998 | Lopez | |
| 5,726,885 A | 3/1998 | Klein et al. | |
| 5,737,710 A | 4/1998 | Anthonyson | |
| 5,751,973 A | 5/1998 | Hassett | |
| 5,790,976 A | 8/1998 | Boll et al. | |
| 5,803,215 A | 9/1998 | Henze et al. | |
| 5,812,070 A | 9/1998 | Tagami et al. | |
| 5,838,251 A | 11/1998 | Brinkmeyer et al. | |
| 5,869,950 A | 2/1999 | Hoffman, Jr. et al. | |
| 5,908,453 A | 6/1999 | Tabata et al. | |
| 5,922,040 A | 7/1999 | Prabhakaran | |
| 5,945,919 A | 8/1999 | Trask | |
| 5,948,040 A | 9/1999 | DeLorme et al. | 701/201 |
| 5,995,013 A | 11/1999 | Yoshizawa et al. | |
| 5,995,898 A | 11/1999 | Tuttle | |
| 6,065,798 A * | 5/2000 | Sankrithi | 296/183.1 |
| 6,078,850 A | 6/2000 | Kane et al. | |
| 6,089,431 A | 7/2000 | Heyworth | |
| 6,129,371 A | 10/2000 | Powell | |
| 6,133,707 A | 10/2000 | Kikuchi et al. | |
| 6,154,006 A | 11/2000 | Hatanaka et al. | |
| 6,157,315 A | 12/2000 | Kokubo et al. | |
| 6,181,991 B1 | 1/2001 | Kondo et al. | |
| 6,185,487 B1 | 2/2001 | Kondo et al. | |
| 6,185,501 B1 | 2/2001 | Smith et al. | |
| 6,225,890 B1 | 5/2001 | Murphy | |
| 6,240,365 B1 | 5/2001 | Bunn | |
| 6,249,233 B1 | 6/2001 | Rosenberg et al. | |
| 6,253,129 B1 | 6/2001 | Jenkins et al. | |
| 6,253,980 B1 | 7/2001 | Murakami et al. | |
| 6,278,936 B1 | 8/2001 | Jones | |
| 6,304,223 B1 | 10/2001 | Hilton et al. | |
| 6,317,720 B1 * | 11/2001 | Murakami et al. | 705/10 |
| 6,336,295 B1 | 1/2002 | Takei et al. | |
| 6,340,935 B1 | 1/2002 | Hall | |
| 6,427,913 B1 | 8/2002 | Maloney et al. | |
| 2001/0037174 A1 * | 11/2001 | Dickerson | 701/200 |
| 2003/0014302 A1 | 1/2003 | Jablin | |

FOREIGN PATENT DOCUMENTS

| | | | |
|---|---|---|---|
| DE | 195 21 902 A1 | 12/1996 | |
| DE | 197 28 885 A1 | 1/1999 | |
| DE | 298 11 292 U1 | 1/1999 | |
| DE | 197 40 602 A1 | 3/1999 | |
| DE | 100 33 341 A1 | 1/2002 | |
| EP | 0 147 284 | 7/1985 | |
| EP | 0 179 160 | 4/1986 | |
| EP | 0 212 842 A1 | 3/1987 | |
| EP | 0 309 318 | 3/1989 | |
| EP | 0 323 326 | 7/1989 | |
| EP | 0 433 740 | 6/1991 | |
| EP | 0 451 482 A1 | 10/1991 | |
| EP | 0 509 776 | 10/1992 | |
| EP | 0 307 485 B1 | 6/1994 | |
| EP | 0 653 732 | 5/1995 | |
| EP | 0 694 885 A2 | 1/1996 | |
| EP | 0 708 427 A2 | 4/1996 | |
| EP | 0 877 341 A2 | 11/1998 | |
| EP | 0 991 031 A2 | 4/2000 | |
| EP | 0 997 861 A2 | 5/2000 | |
| EP | 1 011 085 | 6/2000 | |
| EP | 1 067 480 A2 | 1/2001 | |
| EP | 1 067 481 A2 | 1/2001 | |
| EP | 1 067 498 A1 | 1/2001 | |
| EP | 1172768 A2 * | 1/2002 | G07C/5/00 |
| FR | 2 232 064 | 12/1974 | |
| FR | 2 535 491 | 5/1984 | |
| FR | 2 625 954 | 7/1989 | |
| FR | 2 656 450 | 6/1991 | |
| FR | 2 662 285 | 11/1991 | |
| FR | 2 612 319 | 5/1992 | |
| FR | 2 692 064 | 12/1993 | |
| FR | 2 712 715 | 5/1995 | |
| FR | 2 732 144 | 9/1996 | |
| GB | 2 146 154 A | 4/1985 | |
| GB | 2 271 081 A | 10/1989 | |
| GB | 2 291 235 A | 2/1996 | |
| JP | 11-127750 | 3/1973 | |
| JP | 04-133195 | 7/1992 | |
| JP | 08-138199 | 5/1996 | |
| JP | 10-208195 | 8/1998 | |
| JP | 10254978 A * | 9/1998 | G06F/19/00 |
| JP | 10-255162 | 9/1998 | |
| JP | 10-255191 | 9/1998 | |
| JP | 10-261199 | 9/1998 | |
| JP | 10-266191 | 9/1998 | |
| JP | 11-127788 | 5/1999 | |
| JP | 11-201762 | 7/1999 | |
| JP | 2001067581 A | 3/2001 | |
| JP | 2001-67581 | 3/2003 | |
| WO | WO 84/03785 | 9/1984 | |
| WO | WO 85/01812 | 4/1985 | |
| WO | WO 92/22043 | 12/1992 | |
| WO | WO 95/21435 | 8/1995 | |
| WO | WO 99/44186 | 9/1999 | |

OTHER PUBLICATIONS

Shunji Yano, Implementing ICVA Regional Shared Transportation System in Singapore, IEEE 5th International Conference on Intelligent Transportation Systems, Sep. 2–6, 2002, Singapore, pp. 423–427.*

Matthew Barth, et al., A Hybrid Communication Architecture for Intelligent Shared Vehicle Systems, Intelligent Vehicle Symposium, vol. 2, Jun. 17–21, 2002, pp. 557–563.*

European Patent Office Search Report of 01305580.1–2215, Nov. 7, 2001, 2 pages.

European Patent Office Search Report of 99250392, Feb. 9, 2001, 3 pages.

European Patent Office Search Report of 00305739, Oct. 20, 2000, 2 pages.

European Patent Office Search Report of 95304203, Mar. 8, 1996, 1 page.

European Patent Office Search Report of 94402568, Dec. 12, 1994, 1 page.

European Patent Office Search Report of 91102927, Jun. 13, 1991, 1 pages.

European Patent Office Search Report of 86305442, Oct. 30, 1986, 3 pages.

Australian Patent Office Search Report of SG 20003722-6, Jan. 24, 2002, 4 pages.

Australian Patent Office Search Report of SG 20003721-8, Jan. 24, 2002, 2 pages.

Australian Patent Office Search Report of SG 20013958-5, Nov. 19, 2002, 2 pages.

United Kingdom Patent Office Search Report of GB9413527.4, Sep. 1994, 1 page.

French Patent Office Search Report of FR 0005779, Feb. 1, 2002, 2 pages.

French Patent Office Search Report of FR 0004270, Jun. 29, 2001, 1 page.

French Patent Office Search Report of FR 9503408, Dec. 29, 1995, 1 page.

French Patent Office Search Report of FR 94402568, Dec. 12, 1994, 1 page.

Praxitele web site=http://www–rocq.inria.fr/praxitele/welcome–angl.html?59,31, Dec. 1997.

Bill Donahue, May 17, 2002, Cars You Drive for Just a Little While, Then It's Their Turn, New York Times, Coast), p. 10.

Matthew Barth; Aug. 1999, Stimulation Model Performance Analysis of a Multiple Station Shared Vehicle System, Transportation Research, Issue 7C, vol. 4. Pages (abstract only).

Desimone, et al., "Case studies in Fleet Operation Modelling: An application of AI scheduling techniques", Proceedings of the Winter Simulation Conference 1990, pp. 290–299, ACM 1990.

Bailey, eta l., "A Simulation Analysis of Demand and Fleet Size Effects on Taxicab Service Rates", Proceedings of the Winter Simulation Conference, 1987, pp. 838–844, ACM 1987.

* cited by examiner

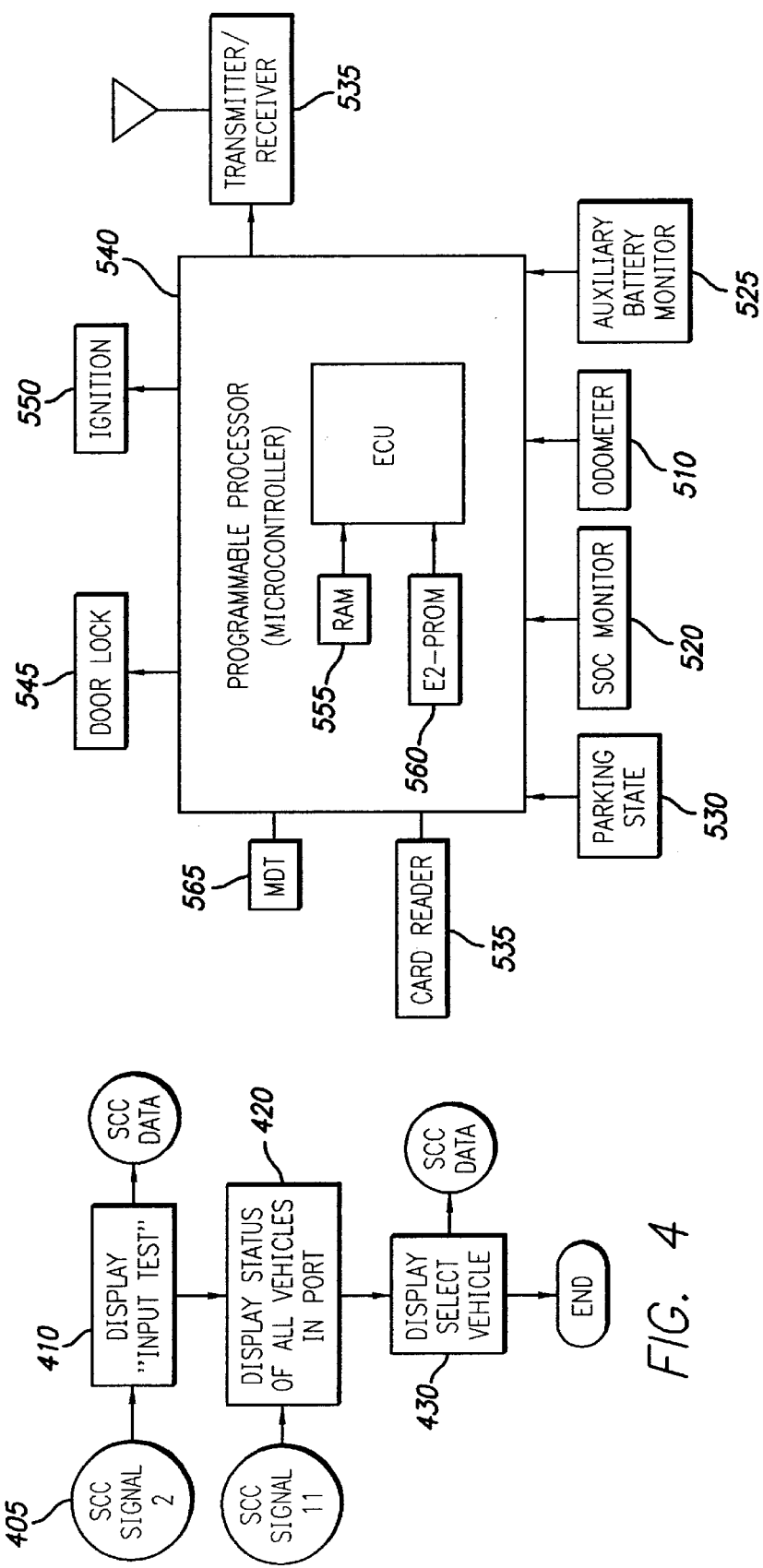

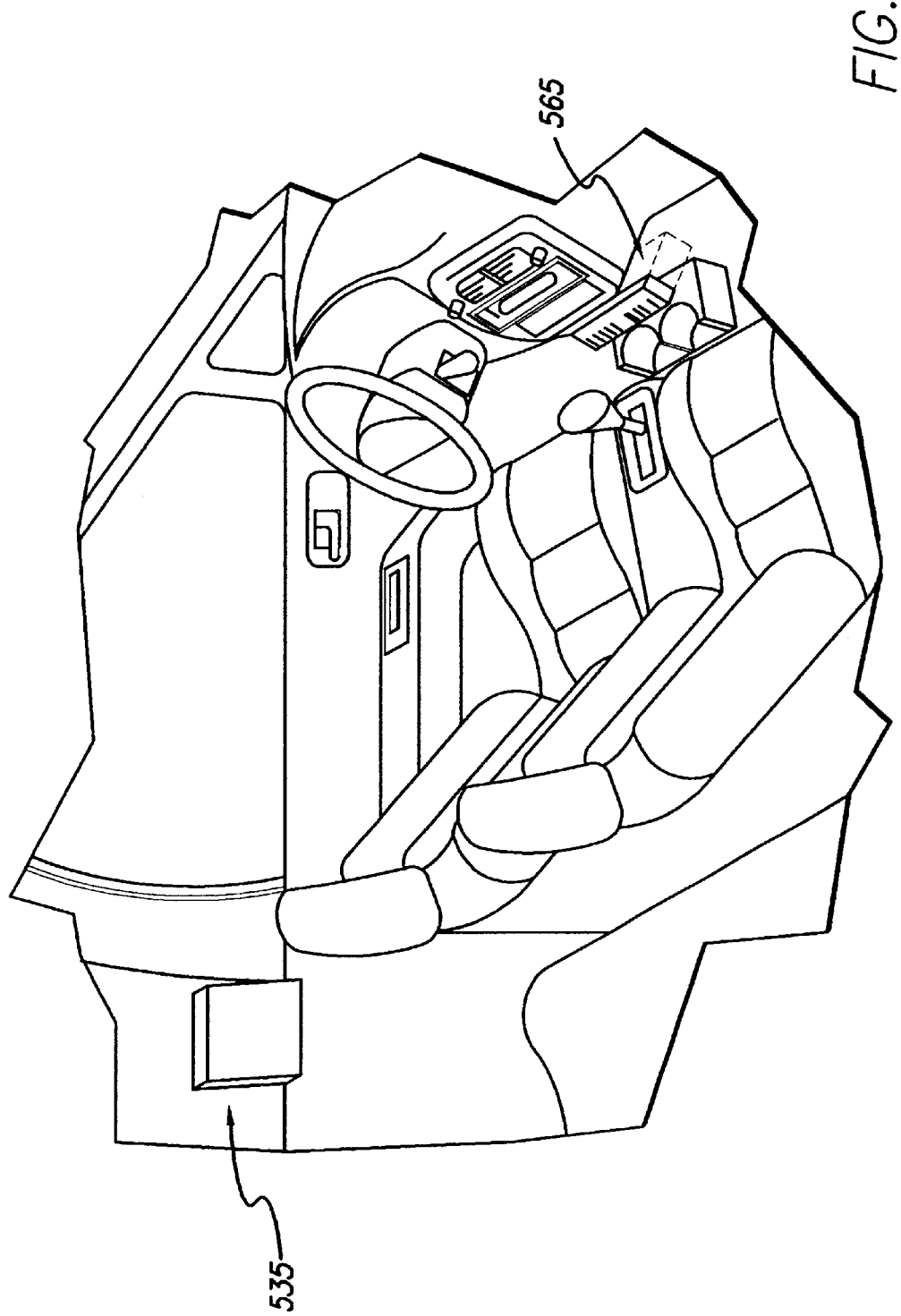

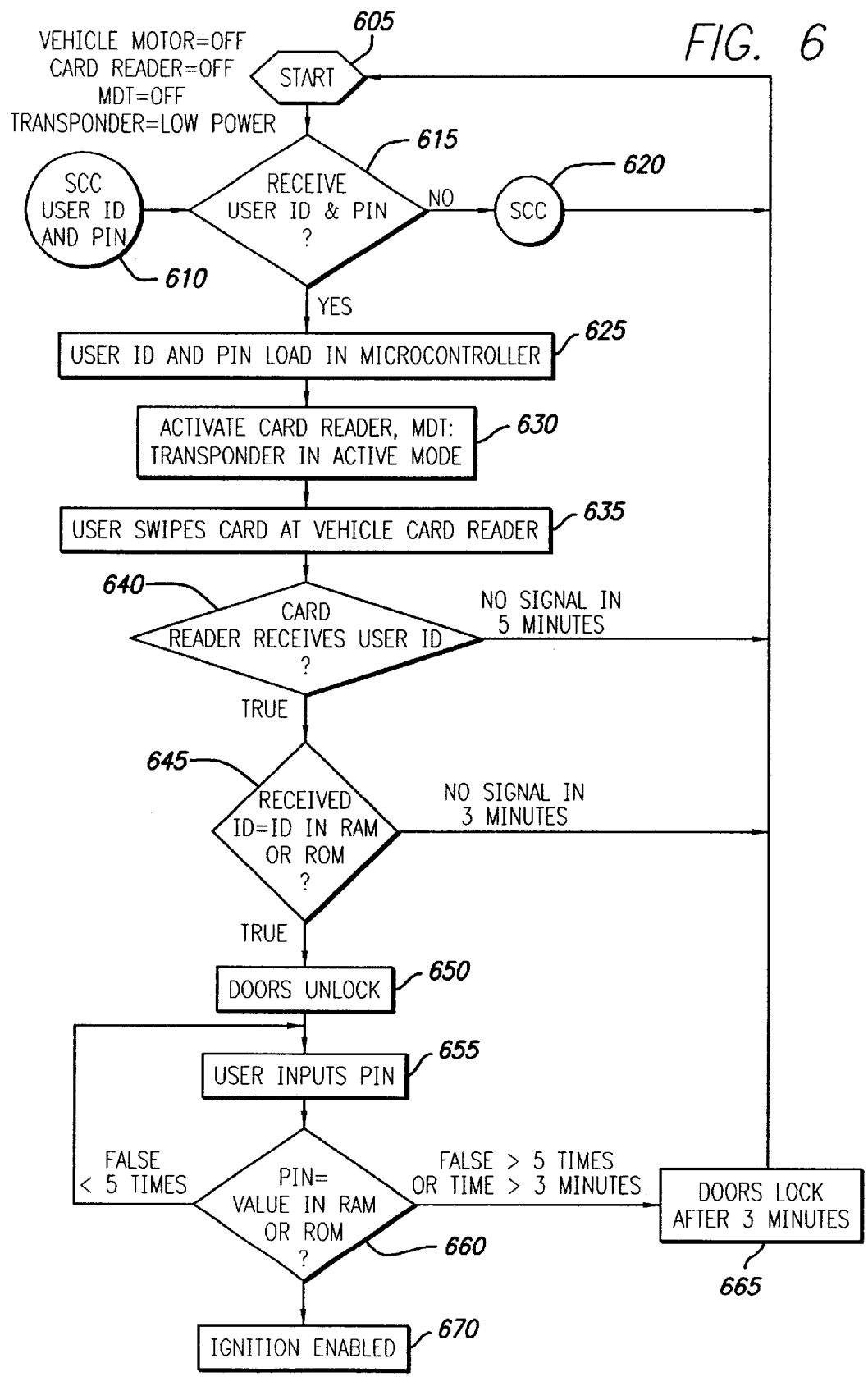

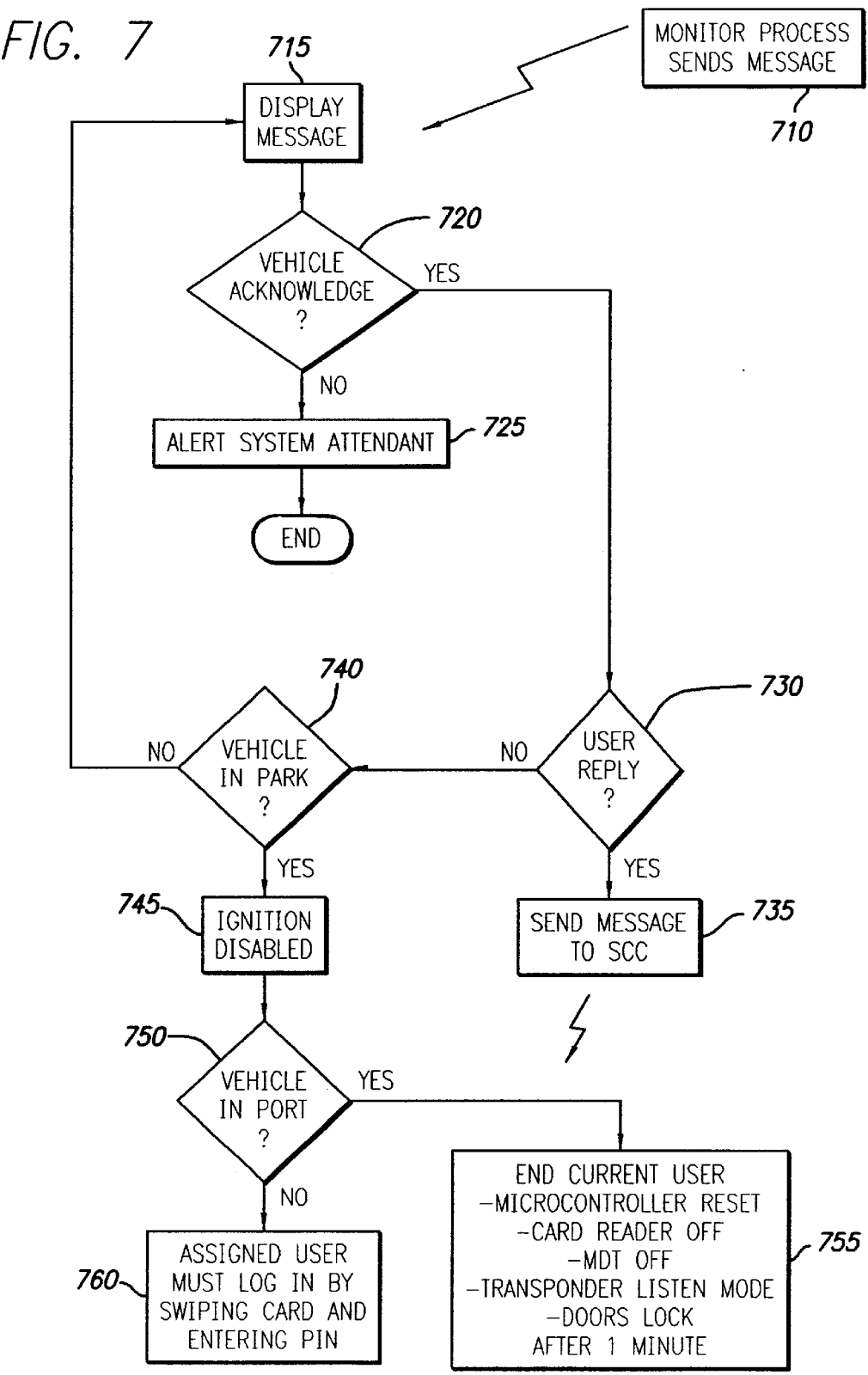

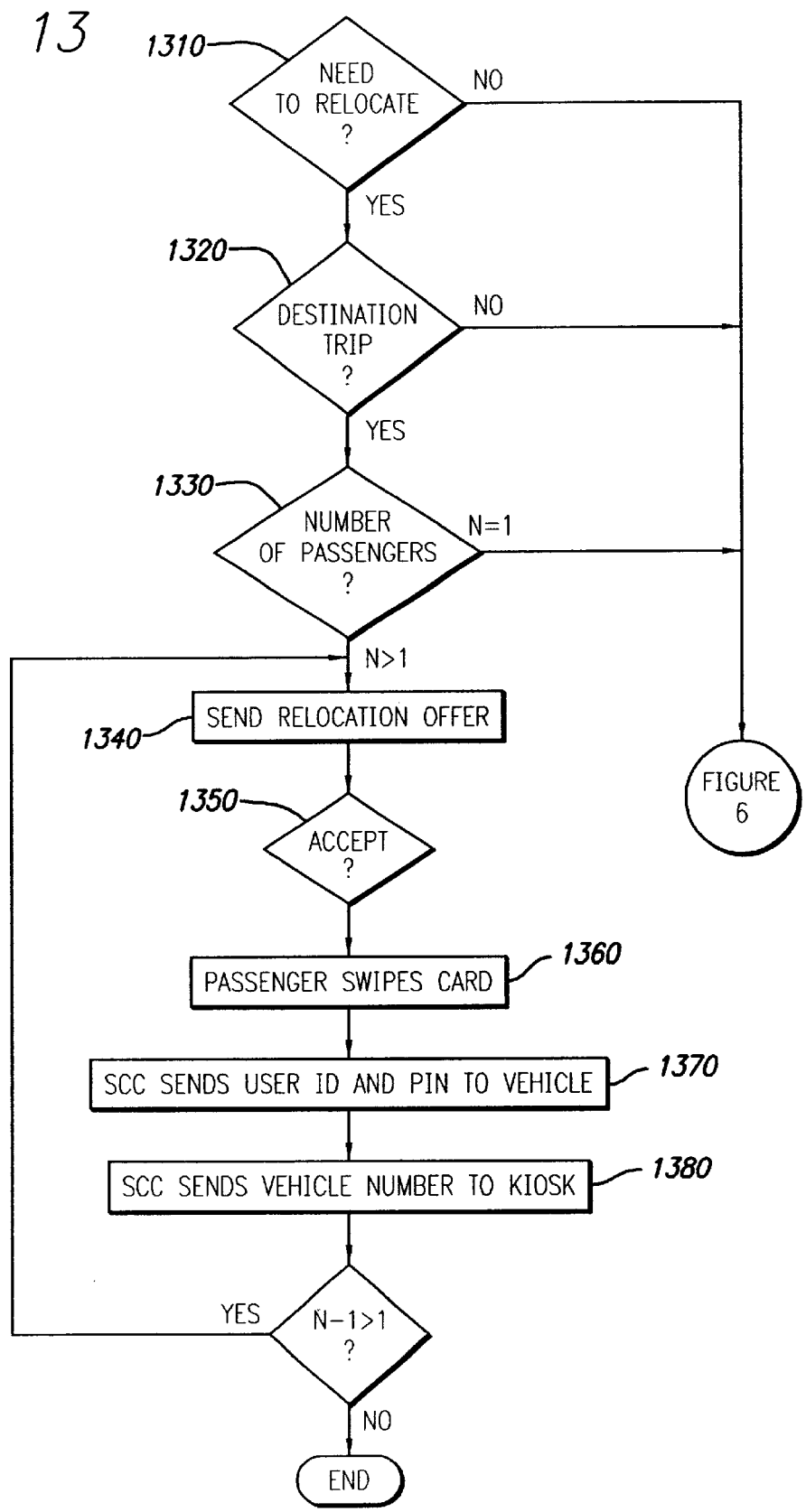

METHOD FOR EFFICIENT VEHICLE ALLOCATION IN VEHICLE SHARING SYSTEM

This application is a continuation in part of U.S. Ser. No. 09/349,049 filed Jul. 7, 1999, and incorporates the disclosure of the parent application by reference as though fully set forth herein.

BACKGROUND OF THE INVENTION

1. Field of the Invention

The present invention relates, generally, to systems and methods for sharing a fleet of vehicles among a plurality of Users and, in preferred embodiments, to such systems and methods for sharing a fleet of electric vehicles, including systems and methods relating to allocating, tracking, securing, managing and relocating shared electric vehicles.

2. Description of the Related Art

In most modern, industrial countries, private automobiles play an important and sometimes indispensable role as a means for transporting people within and beyond local areas, for example, to and from places of work, study or worship, on errand trips or in commercial activities, such as deliveries, sales visits, repair visits or the like. As a result of these important roles, the number of automobiles in and around most industrialized cities and neighboring regions continues to grow. The increasing numbers of automobiles results in increasing occurrences of traffic jams and demands for parking spaces.

Mass transit systems, such as busses, commuter trains, subways, streetcars or the like can fulfill some of the transportation needs of those communities and municipalities that have such systems. However, travel with such systems is confined to pre-set stop locations and times, set by the route and time schedule of the bus, train, subway or streetcar. The prescribed routes and time schedules typically do not meet many travelers' needs or are too inconvenient for practical usage of the mass transportation system by some travelers. For many mass transportation Users, the pre-set stop location is far enough from their origination or destination locations that they must find additional modes of transportation to or from the pre-set stop. For example, some Users drive private vehicles to and from pre-set stop locations and park the vehicles near the stop locations. Some mass transportation systems even provide vehicle parking facilities near pre-set stop locations for such Users.

For example, commuter train stops and bus stops in and near some cities are often provided with parking lots for train Users to park private vehicles. However, vehicles in such parking lots typically remain parked throughout a large part of the day, and are driven only in the morning to bring the User to the train or bus stop and in the evening to take from the train or bus stop. Thus, while modern mass transportation systems can result in a reduced number of vehicles on the road at any given time, such mass transportation systems do not eliminate the need for private vehicles and can result in an inefficient use of private vehicles.

Accordingly, there is a need for a system and method for the efficient and convenient use of private vehicles, such as an efficient and convenient shared vehicle system and method. Shared vehicle systems can provide more flexibility than other means of public transportation. In a shared vehicle system, a number of vehicles are normally maintained in several designated parking areas. Each User is allowed to pick up a vehicle at one parking area, and return the vehicle to the parking area nearest to the User's destination. The User may also drive a vehicle out of a designated parking area for an errand and return the vehicle to the same designated parking area. Shared vehicle systems that are used by a relatively large number of subscribers should include sufficient security measures to protect the vehicles from theft and also to protect the User from crime.

Shared vehicle systems must be sufficiently convenient to motivate Users to employ the system. Accordingly, vehicle availability within a reasonable time of a User's request for a vehicle is very important to the success of such a system. Of course, by maintaining a greater number of vehicles in the fleet of shared vehicles, the availability of a vehicle at any given time can be increased. However, system cost is minimized and the efficiency of vehicle usage is maximized with smaller vehicle fleets. Accordingly, there is a need for a shared vehicle system that maximizes User convenience yet minimizes the number of vehicles required in the fleet.

In particular, by employing vehicles in a shared vehicle system or method, additional ecological advantages can be achieved. Vehicles in a shared system may be of many types. They may be the conventional petroleum based gasoline or diesel fuel type vehicles. They may however employ cleaner forms of propulsion such as methanol or propane powered vehicles, or may be vehicles powered by hydrogen stored as a gas or metal hydride. Electric vehicles may draw energy from batteries, fuel cells, generators driven by internal combustion engines, or combinations of different energy sources. Electric vehicles powered by both lead acid and nickel metal hydride batteries have shown much promise and several manufacturers have produced viable electric vehicles employing these battery technologies. Electric propulsion is a good candidate for use as a shared vehicle. Sharing systems and methods are in no way dependent on the use of an electric vehicle, and may be employed with a number of non electrical or hybrid technologies, including common gasoline power.

The use of electric powered vehicles in a fleet of shared vehicles, however, presents further complexities over other alternate power vehicles. For example vehicle charging requirements and vehicle unavailability during charging times are not concerns with conventional vehicles.

Electric vehicles typically require charging more often than the conventional vehicles require refueling. Recharging stations are not nearly as available as conventional petroleum motor fuels. Moreover, recharging of an electric vehicle typically takes much more time than refueling a conventional vehicle. Thus, if a conventional vehicle is present at a designated parking area of a shared vehicle system, but does not have sufficient fuel to meet a User's travel needs, the vehicle can be quickly refueled and made available to the User. However, even when an electric vehicle is idle in a designated parking space, it is not available to a User unless it has a sufficient existing state of charge (SOC) to make the User's intended trip. Typically, an electric vehicle cannot be re-charged quickly enough to make the intended trip if its existing SOC is inadequate. On the other hand, if the User intends to make a short trip, the vehicle may be capable of making the intended trip even though it is not fully charged. Accordingly, there is a further need for a system and method for managing shared electric vehicles in an optimum fashion and to meet the needs of a maximum number of Users with a minimum number of vehicles.

SUMMARY OF THE INVENTION

Preferred embodiments of the present invention relate to shared vehicle systems and methods that maximize User convenience and minimize the number of vehicles required in the shared fleet.

A shared vehicle system according to an embodiment of the present invention includes a central station, at least one port for vehicle distribution and a plurality or fleet of vehicles, each having a vehicle subsystem. In general, the central station, port and each of the vehicles are able to communicate so that the vehicles can be requested, allocated and used in an efficient and reliable manner.

Briefly, a User enters information to request a vehicle at a port. That information is communicated to the central station, where the information is processed by a system control computer to select a vehicle from the fleet for allocation to the User at the port. The system control computer communicates with a computer subsystem located in the port from which the User entered the request. The system control computer also communicates directly with the assigned vehicle to provide secure access to the selected vehicle by the assigned User, to monitor vehicle location and operating status, to monitor the state of charge of electric vehicles and to provide other functions described below.

According to one aspect of the invention, allocation of shared vehicles to Users is based in part on travel information received from Users. By allocating vehicles based on travel information, the usage of vehicles and User convenience can be optimized. While various embodiments related to this aspect of the invention may employ any form of shared vehicle, according to further embodiments of the present invention, vehicle sharing systems and methods employing electric vehicles in the shared fleet are disclosed. The allocation of electric vehicles to Users is managed to maximize vehicle availability and minimize vehicle downtime, taking into account the state of charge of a vehicle as well as the charging rate of a vehicle.

In preferred embodiments, vehicle parameters such as stored energy are tracked and processed for purposes of efficient allocation of vehicles to Users as well as for selection of vehicles for charging. This information is sent from vehicles to the system control computer, preferably by radio frequency transmission. In the presently preferred embodiment, radio frequency transmission is bidirectional, allowing messages from the central station to be transmitted to individual vehicles as well.

The location of vehicles is also tracked and stored by computers located in the central station. In further preferred embodiments, the vehicle subsystem includes a vehicle locator system such as global positioning system (GPS), dead reckoning system, radio beacon triangulation system, or a variety of other techniques. In particularly preferred embodiments, vehicle location information is provided by a radio beacon triangulation system such as that operated by Teletrac® Teletrac is a trademark of Teletrac, Carlsbad Calif.).

According to another aspect of the invention, a shared vehicle system or method provides controlled or secured access to the shared vehicles. In preferred embodiments, User identification information is provided to a vehicle that has been assigned to a User and such information must match information presented by the User in a User interface device installed on the vehicle, before the User is allowed access to the vehicle. In yet further preferred embodiments, a User's personal identification number ("PIN") must be entered by the User in a second interface device installed within the vehicle which must match an expected PIN, before the vehicle is enabled for operation. In particularly preferred embodiments, staff identification information is permanently stored in the vehicle subsystem. Accordingly, staff members may gain entry and operate any of the vehicles without the need to have the vehicle allocated by the system control computer. In another particularly preferred embodiment, User interface devices in vehicles not allocated remain in a power conservation, mode until allocated.

According to yet another aspect of the invention, a shared vehicle system and method involves allocating vehicles from a group of available vehicles and returning vehicles allocated to a User to the group of available vehicles upon detection of a parking state while the vehicle is located at a port. In preferred embodiments, the detection of a parking state is accomplished by, for example, the detection of the setting of the vehicle in a parking gear, the lack of motion of a vehicle for a period of time, the opening and/or closing of a vehicle door, or a combination of such events, each of which require no User interaction other than the typical actions taken to park a vehicle.

According to a further aspect of the present invention, a shared vehicle system and method involves transporting or relocating vehicles from one area or port having a surplus of vehicles to another area or port having a shortage of vehicles. Vehicles may also be transported to effectively use storage space for the parking of the vehicles. According to another aspect of the present invention, a shared vehicle system and method involves a vehicle transport system for transporting a first vehicle with a second vehicle, for example, for relocating the first and/or second vehicle.

The above and other aspects, features, and advantages of the present invention, will become apparent from the following description when taken in conjunction with the accompanying drawings in which preferred embodiments of the present invention are shown by way of illustrative example.

BRIEF DESCRIPTION OF THE DRAWINGS

Referring now to the drawings in which like reference numbers represent corresponding parts throughout:

FIG. 4 is a flow chart representation of steps carried out by a staff member to request and select a vehicle;

FIG. 6 is a flow chart representation of steps carried out by the vehicle subsystem when a User accesses an assigned vehicle;

FIG. 7 is a flow chart representation of steps carried out to track vehicle location and exchange message information during vehicle use including steps taken when use of a vehicle ends.;

FIG. 13 is a flow chart representation of steps carried out when the system control computer detects the necessity for vehicle relocation and the User is requesting a vehicle according to an embodiment of the present invention;

DESCRIPTION OF THE PREFERRED EMBODIMENTS

The following description of preferred embodiments refers to the accompanying drawings which form a part of this disclosure. These embodiments illustrate ways in which the invention may be practiced. It is to be understood that other embodiments may be utilized and changes may be made to the specific structure, or methods disclosed without departing from the scope of the present invention.

The invention relates generally to systems and methods for sharing a fleet of vehicles among a plurality of Users, and various aspects of such systems and methods including optimizing vehicle allocation, vehicle tracking, security, and charging and managing a fleet of shared electric vehicles. As discussed above, in a shared vehicle system, a number of vehicles are normally maintained in several designated parking areas referred to herein as ports. The ports also include equipment for charging the batteries of the vehicles, as well as computer subsystems, for communicating with the central computer system. Preferably, computer subsystems are located within kiosks to provide security and to protect the equipment from weather. A User may begin a trip at one port, and return the vehicle to another port more convenient to the User's destination, or to return the vehicle to the port facility at which the trip was begun.

To successfully attract people to subscribe and become Users of a shared vehicle system, the system must be sufficiently convenient and inexpensive. More particularly, Users should be able to pick up a vehicle at a convenient location and with minimal or no waiting time. The system should be easy and inexpensive for the User and cost effective for the system administrator to operate. To have minimal environmental impact, the system should be capable of addressing the above needs and employing clean power sources, such as electric vehicles, as its primary shared vehicle.

Preferred embodiments of the present invention relate to shared vehicle systems and methods which address the above-described needs and provide additional advantages discussed below. As will become apparent from the discussion below, some embodiments pertain only to sharing systems containing at least some electrical vehicles. Those embodiments of the invention relate to charging or the state of charge of electric vehicles and may be implemented with or without various other aspects relating to, for example, vehicle allocation, tracking, and securing. Similarly, embodiments of the invention relating to vehicle allocation aspects may be implemented with or without various other aspects such as vehicle charging, tracking and securing, and embodiments relating to vehicle securing may be implemented with or without other aspects such as vehicle tracking, allocation or charging.

Figure 1:
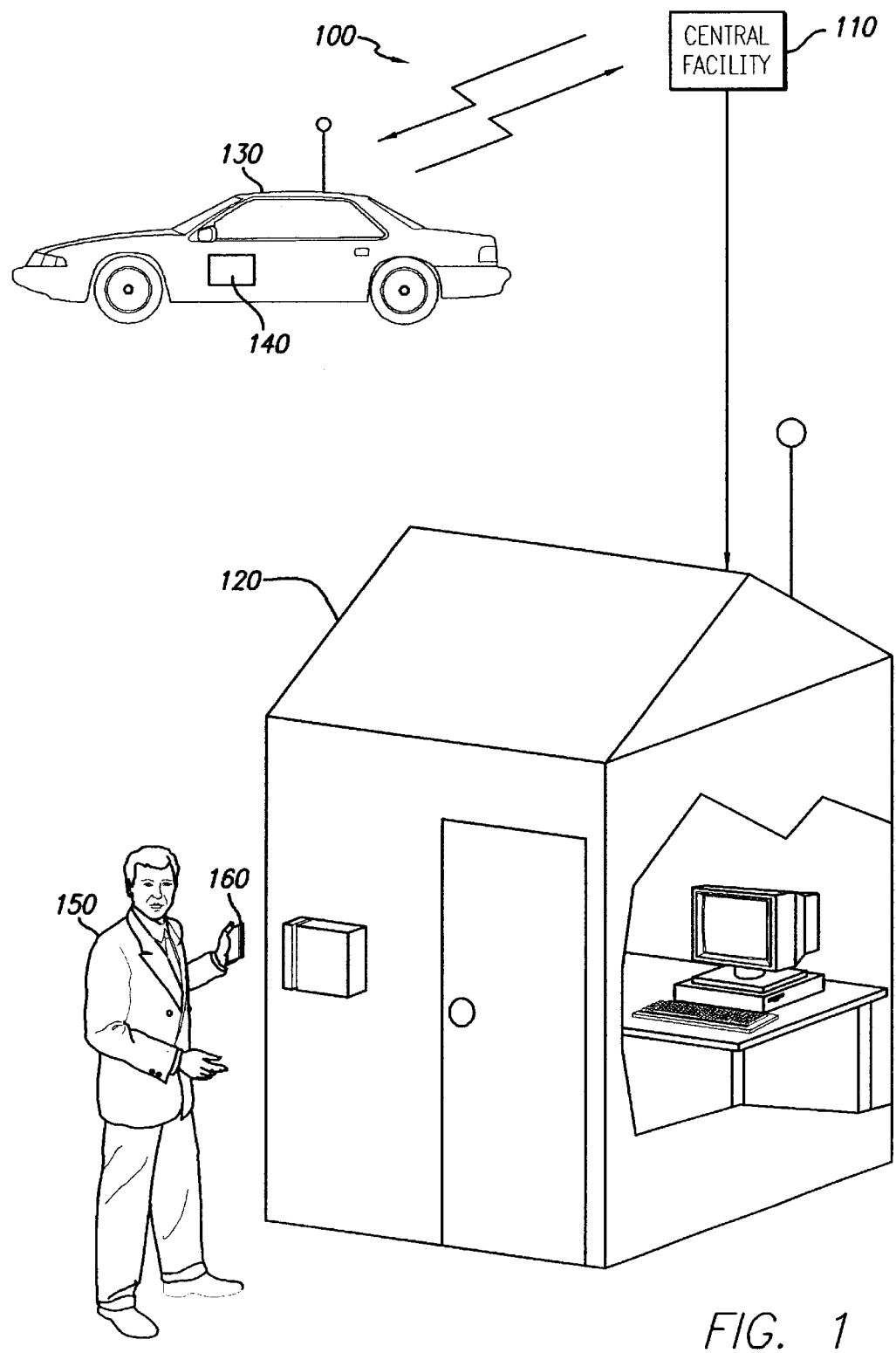
FIG. 1 is a schematic diagram of an overview of the vehicle sharing system

A schematic representation of a shared vehicle system 10 according to a preferred embodiment of the present invention is shown in FIG. 1. The system includes a central facility (110) comprising a system control computer for administering the vehicle sharing system, at least one port including a kiosk (120) with a computer subsystem including input and output equipment in communication with the system control computer, and a fleet of vehicles 130, one of which is shown in FIG. 1, each having a vehicle subsystem (140) in communication with a system control computer. The system control computer communicates with the computer subsystem in kiosk (120) and the vehicle subsystem 140, according to various embodiments described below, to allocate vehicles in response to requests by Users, to notify a User of the vehicle allocated, to provide secure User access to the selected vehicle, to monitor the location and operating status of vehicles in the fleet, to monitor the state of charge of electric vehicles and to provide other functions described below.

In preferred embodiments the system control computer and the computer subsystems are configured as sever and client respectively. The server and client communicate using standard Internet based hypertext transfer protocol ("http"). When information is requested from Users, the request preferably is made by transmitting active server web pages requesting the information to the client computer subsystem, and processing the User's response thereto. In alternative embodiments the message requesting information from the User may be generated locally or stored at the computer system and called by appropriate command from the server. In further embodiments, the computers may be linked directly be dedicated lines rather than by Internet.

1. Selection and Allocation of Vehicles

According to one aspect of the present invention, systems and methods for sharing electric vehicles involve selecting and allocating vehicles to Users based on a combination of factors for maximizing both efficiency and convenience. Such factors include the location of the vehicles relative to the port from which a request is submitted, the state of charge of the vehicles, the distance that the User expects to travel, the period of time that the User expects to use the vehicle, the User's expected arrival time, the User's expected destination, vehicle use patterns of particular Users, the number of individuals waiting for vehicles in the port, and the number of vehicles available at the port. Vehicle selection and allocation occurs in real time by direct communication between the central station, the ports and the vehicles.

Figure 2:
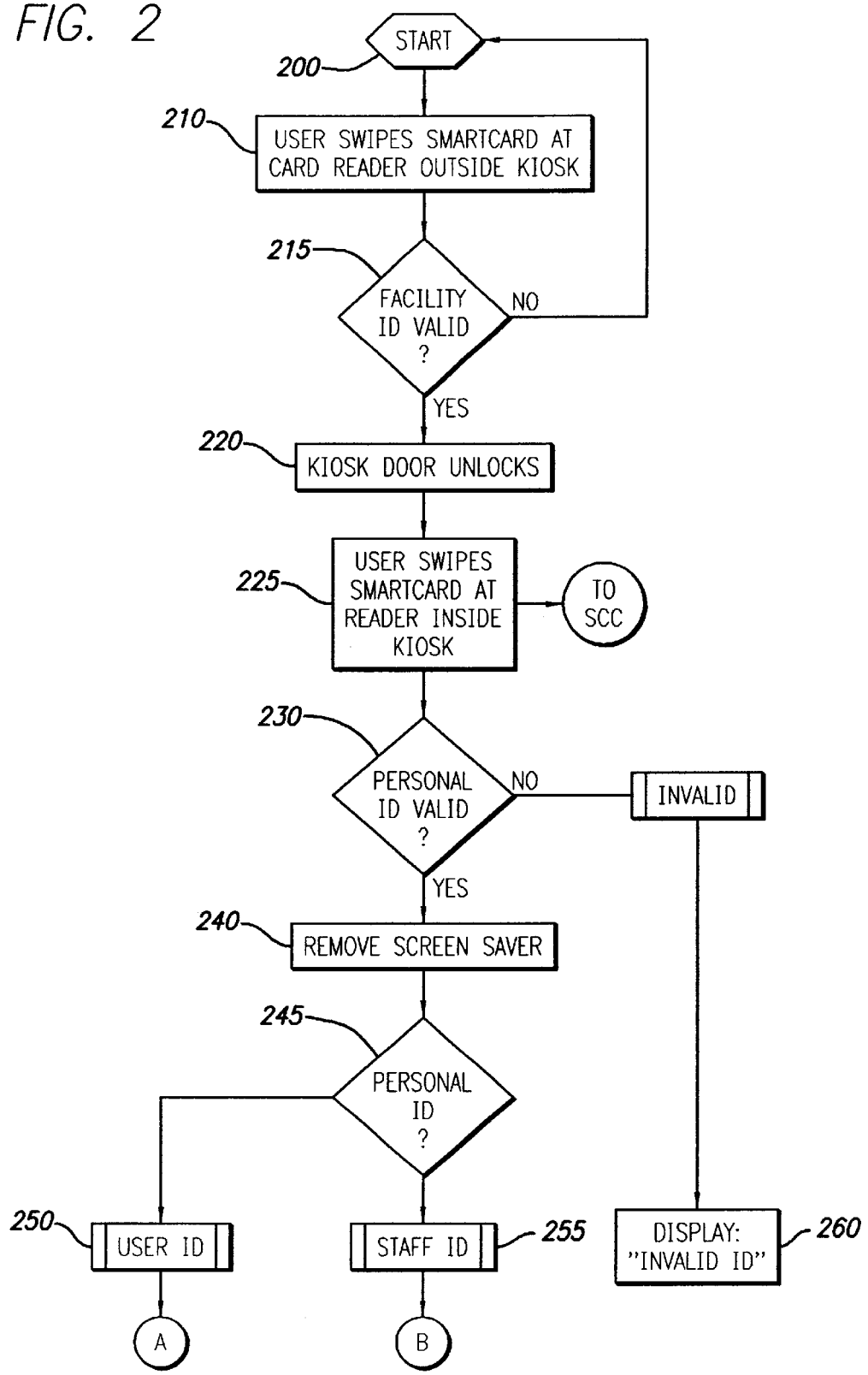
FIG. 2 is a flow chart representation of steps carried out to log into a terminal computer at a kiosk.

As shown in FIG. 1, User 150 desiring to obtain the use of a vehicle 130 arrives at a port. As shown in the flow chart of FIG. 2, at block 210, the User swipes a smart card 160, or other machine-readable token, at a card reader on the outside of kiosk 120 in FIG. 1, which is located at the port.

In a presently preferred embodiment, the machine readable token is a contactless security access card that is read by a passive RF antenna. The card is encoded with 26 machine readable bits. The first 8 bits are common to all Users and are referred to herein as a facility ID; the next 16 bits are uniquely assigned to each User, and are referred to herein as a personal ID; the last two bits are used to verify the integrity of the encoded information read by the card reader by checking parity. The 26 bits are collectively a "User ID." Other machine readable tokens, such as those readable by optical signals, are also within the scope of the invention.

Following a card swipe at block 210, the facility ID is read by a card reader attached to the outside of the kiosk. If the facility ID is correct, the kiosk unlocks, and the User is able to enter and access the computer subsystem located inside. A screen saver, preferably displayed when the computer subsystem is inactive, is removed at block 250, after the kiosk door unlocks (block 240). The User swipes a smartcard at a second card reader located within the kiosk. The User ID and the kiosk location is sent to a system control computer at the central facility (block 220). From the personal ID portion of User ID information, the system control computer makes a determination as to whether the ID is assigned to a User (27), Staff (28), or is invalid (29).

Figure 3:
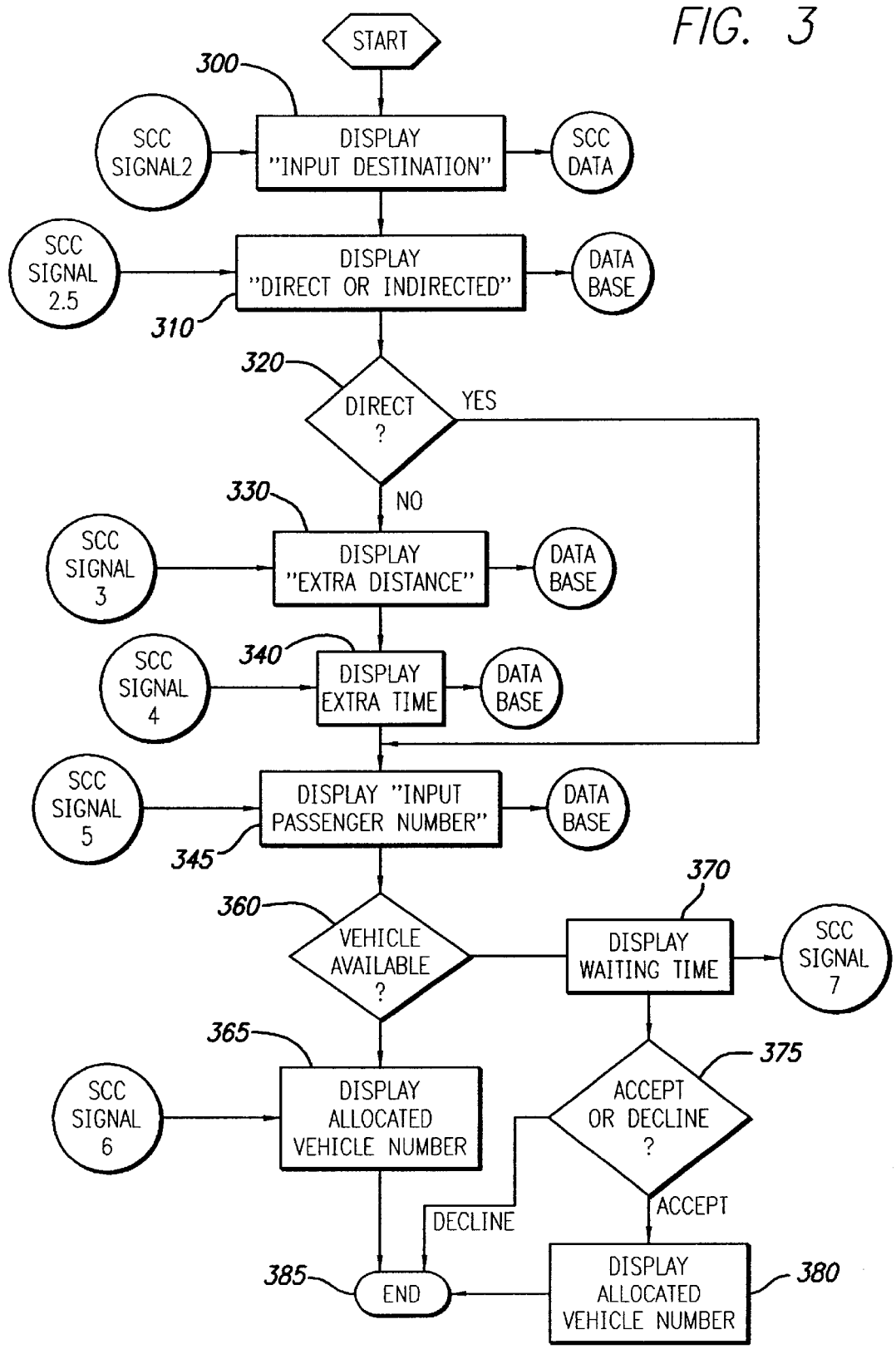
FIG. 3 is a flow chart representation of steps carried out by a User to request, select and allocate a vehicle.

If the User ID is assigned to a User, program flow continues to a User Subroutine, summarized in FIG. 3. At block 300, the computer subsystem from which the User initiated a request receives signal 2 from the system control computer, which causes a request for the User's destination to be displayed. The User is requested to input his intended final destination which is sent to the system control computer and stored in a data base. In response to signal 2.5 from the system control computer, at block 310 the User is asked whether the vehicle will be used for a Destination Trip or for an Errand Trip. A Destination Trip is defined as a trip from one port to another, while an Errand Trip includes at least one stop at a point that is not the final destination entered at block 300. If at block 330 the User indicates that the requested vehicle is to be used for an Errand Trip, the User may be asked to provide additional information, such as the number of additional miles (330) or the additional time (340) the errand trip is expected to require. Regardless whether an Errand Trip is to be included, all Users are asked for the number of passengers traveling with them at block 345.

Currently, the computer subsystem asks the user the number of passengers for the intended trip. Currently, this question is used only for logging purpose, but may be advantageously utilized for relocating the vehicles from one port to another for efficient utilization of the vehicles. In such a case, the system needs to know the number of eligible drivers among the passengers, and the user is required to declare the number of eligible drivers. As an incentive to make the users more actively involve in car relocation, the system may be provided with an arrangement for rewarding the users who are willing to provide an additional driver to relocate a second vehicle (or even a plurality of vehicles).

When a user enters a request for a vehicle from the touch panel or keyboard of the computer subsystem, the system asks the user if the intended trip is a direct or indirect trip. The distinction between a direct trip and an indirect trip allows a relatively accurate estimation of the time duration of the trip. However, according to the analysis of data which was collected during the operation of the system over a certain time period, it was found that the vehicles were used for a direct trip in a majority of cases, if the user selected a port different from a departure port. In other words, the time durations of trips to a same destination typically fall into a narrow time window, and cases of extended time durations or errand trips are relatively rare. Based on this recognition, it is possible to do away with the requirement to declare if the intended trip is a direct path or indirect path without causing any significant errors in estimating the time duration of a trip simply from the distance to the destination.

Accordingly, in an alternative embodiment, a User is simply asked for his destination. If the final destination is different than the port at which the trip begins, the trip is considered a Direct Trip. Experience shows that when the final destination is not the same as the place where a trip is begun, in the great majority of cases, the trip is a Direct Trip. It is believed that streamlining the vehicle allocation process by eliminating a step in which Users are asked whether a trip is a Direct Trip or an Errand Trip will make the system more user friendly.

As described in greater detail below, the system determines whether vehicles are available for the trip requested (block 350). If available, a vehicle is allocated and the vehicle number is displayed by the computer subsystem (block 365). If a vehicle is not then available, the waiting time for a vehicle is displayed (block 370). At block 375, the User is asked to accept or decline the vehicle offered. If the offer is accepted, the number of the assigned vehicle is displayed by the computer subsystem (block 380). If the offer is declined, the program ends (block 385). As described in more detail below, in preferred embodiments, individual passengers traveling together may be assigned to different vehicles to assist in relocating vehicles when appropriate.

As shown in the Kiosk Flow Chart (FIG. 2), the system of the present invention distinguishes between a staff ID and a User ID. If the User ID is recognized as a staff ID, program flow branches to the Staff Subroutine shown in FIG. 4. As shown in FIG. 4, in response to a signal from the system control computer the Staff Subroutine, staff members are asked at block 410 for their destination. At block 420 the computer subsystem displays the status of each vehicle in the vehicle fleet, together with a "check box" which provides staff members with an opportunity to select one or more vehicles. Staff members may be presented with information concerning all vehicles located at the particular port, as well as indications of which vehicles require relocation. Vehicle information displayed at block 420 preferably includes the state of charge of the vehicle, and any required maintenance. Based on this information, a staff member may select a particular vehicle for maintenance or relocation purposes.

2. Description of Vehicle Subsystem

Each vehicle 130 in the shared vehicle fleet is provided with an onboard computer system referred to herein as a "vehicle subsystem" 140 for communicating vehicle system and location data to the system control computer and for performing a variety of other functions described below. The features and components of a vehicle subsystem are shown in FIGS. 5*a* and *b* in diagrammatic form.

The vehicle subsystem communicates with a monitoring process of the system control computer to provide updated information regarding the location and status of each vehicle in the fleet of shared vehicles. The vehicle subsystem obtains information from instruments within the vehicle such as the odometer (510) and battery charge indicator (520), as well as engine and transmission monitoring devices (530). The state of charge of the traction and auxiliary batteries is preferably determined according to methods disclosed in U.S. Pat. No. 5,614,804, the disclosure of which is incorporated herein by reference.

Vehicle status information together with vehicle-specific identification information is broadcast periodically, preferably every 30 seconds by a transponder (535) installed within the vehicle. Signals broadcast by the transponder also permit vehicle location to be determined by, for example, radio beacon triangulation. Other techniques known in the navigation field, previously mentioned, may also be used. In the presently preferred embodiment, vehicle status and location information is relayed to a system/vehicle interface by Teletrac®.

Figure 5C:
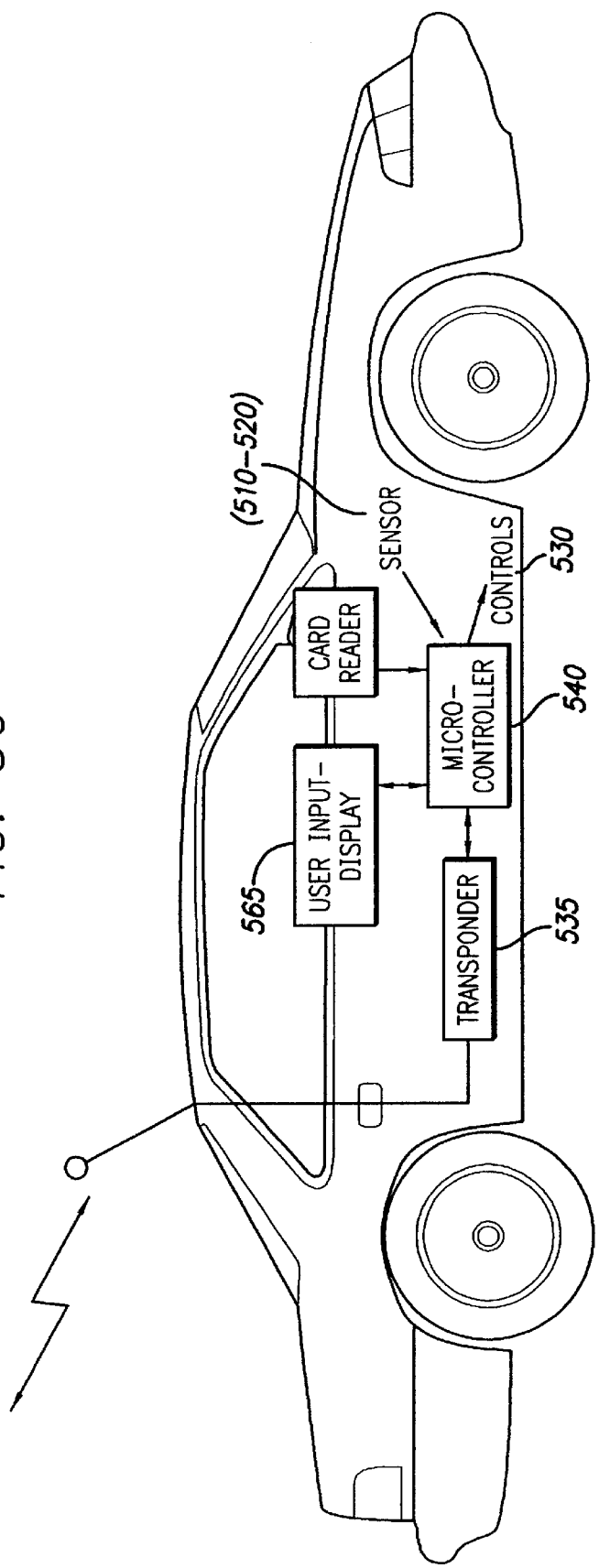
FIG. 5 consists of diagrams of the vehicle subsystem to show its components as located in a vehicle (5A) and (5C), and in schematic form (5B)

As shown in FIG. 5, the vehicle subsystem includes a programmable processor ("microcontroller") 540 that receives inputs from instruments, gauges and other devices for providing information regarding vehicle status. In the presently preferred embodiment, the microcontroller is a Motorola model 68HC11.

In addition to monitoring vehicle status information, the microcontroller also provides secure access to the vehicles.

User ID and PIN information is broadcast to each vehicle and stored in the microcontroller, at the time the vehicle is allocated by the system control computer, to insure that only authorized Users may operate the vehicle.

The microcontroller compares the User ID information provided by a card reader (545), accessible from the exterior of the vehicle and PIN information entered in a multi display terminal ("MDT") (565) with the values provided by the system control computer to verify the identity of a User attempting to access the vehicle.

The microcontroller also controls powered door locks (545) in response to commands from the system control computer. In addition, the microcontroller also controls the vehicle ignition system (550), thereby enabling or disabling the electrical motor that powers the vehicle.

The microcontroller preferably includes random access memory (RAM) (555) and electrically programmable read only memory (ROM) (560). When a vehicle is allocated to a particular User, User ID information is stored in RAM. When the vehicle is allocated to another User, User ID information for the previous User is cleared and that for the newly assigned User is stored.

In order to allow any staff member to access and drive a vehicle, for example, in the event of trouble, staff ID information is stored in an electrically erasable programmable read only memory. The staff ID information remains stored in the E2-PROM when the vehicle is turned off.

Once under way, the microcontroller sends vehicle status information to a monitoring process running on the system control computer to provide constantly updated vehicle status and location information. Upon arrival at a port at the conclusion of a trip, the microcontroller performs a shut down sequence and waits for another trip request from the system control computer.

Normally, each vehicle is tracked by the TeleTrac system, and this would not create any problem while the vehicle is in motion. Because, even if the vehicle moves into a blind spot for the system, the vehicle will eventually come out of the blind sport, and the system will be able to locate the vehicle. However, it is possible that the port in which the vehicle is located may not be covered by the TeleTrac system. It may be so due to the unfortunate selection of the location of the port or a temporary problem with the Tele-Trac system. In either case, any failure to locate a vehicle by the system renders the vehicle unavailable for use even though the vehicle may be sitting idle in the port.

To improve the reliability in locating the vehicles, each port may be provided with a short-range radio communication system for locating the vehicles in the particular port. Because the vehicle is located by the TeleTrac system once outside the port, the proposed system may be considered as a hybrid system in the sense it combines the global locating system by TeleTrac and the local locating system at each port using the short-range radio communication, and can provide a high reliability at a low cost.

Such a hybrid communication system is valuable in other situations as well. In this system, the user initially enters data on his trip needs and his ID from the touch panel and the card reader of the computer subsystem, respectively. The system assigns a vehicle which suits his needs, and permits the door of this vehicle to be unlocked simply in response to a swiping of the correct ID card at the vehicle. It is accomplished by the central control computer directly communicating with the vehicle subsystem, typically via a public cellular phone service.

Such a public cellular phone service, however, may not be entirely reliable. Should the system fail to operate properly due to a breakdown of communication, the authorized user would not be able to unlock the door or use the vehicle. Such an occurrence can seriously damage the users' trust of the system. Conversely, should the system fail to detect the completion of the use of a vehicle by the user due to a breakdown of communication, the charge to the user would continue to run even after he has released the vehicle, and this would lead to serious consequences.

To avoid such a situation from occurring, it is desirable to provide a secondary line of communication both for placing a vehicle available to a user, and for detecting the completion of a trip. A convenient arrangement would be to mount a radio transceiver in each vehicle to allow the vehicle to communicate directly with the computer subsystem of the port in which the vehicle is located.

Also, it is desirable that the user can at least unlock the door and start the vehicle even if the system fails to operate properly once the vehicle is assigned to the user. When he parks the car outside the ports, it is essential that he can gain access to the vehicle, and start it even when the system is unable to operate properly. In this regard, it is desirable to provide the vehicle with a storage device which stores the data of the authorized user from the initial assignment of the vehicle to the user until the final completion of the trip. Thus, the user is able to operate the vehicle without any interruption even in case of a system failure once the vehicle is assigned to him on the one hand, and the operator of the system can avoid frequent requests for assistance from the users.

3. Vehicle Security System With Reduced Power Consumption

In preferred embodiments, to minimize consumption of electrical power while vehicles are not in use the vehicle subsystem reverts to a low power state when the vehicle subsystem detects that the vehicle is idle, as when the transmission is set to "park" or the electric motor is off. In low power mode, no power is supplied the vehicle electric motor, the card reader or MDT, and the transponder is in a low power or "listening" mode in which it can respond to signals from the system control computer, but does not broadcast signals for determining vehicle location or status.

As summarized in FIG. 6, when a vehicle is assigned to a User, User ID and PIN information are transmitted to the vehicle's microcontroller from the system control computer at block 610 by radio frequency transmission. In the presently preferred embodiment, the information is transmitted using a commercial system operated by Teletrac. In the most preferred embodiments, a specialized RF link between the computer subsystem at the port and the vehicle is used to transmit User ID and PIN information to improve the reliability of data related to vehicle security. If the receipt of User ID and PIN information by the vehicle subsystem is not acknowledged (block 615) the system control computer reverts to an initial state (block 605). User ID and PIN information are stored in random access memory in a vehicle's microcontroller at block 6. Receipt of these signals restores the transponder to fully operational mode (block 630); power is also supplied to the MDT and card reader, causing those systems to also become operational. If a vehicle is assigned to a staff member, receipt of Staff ID information will also restore the vehicle subsystem to fully operational mode, After power-up the card reader waits for input of User or staff ID information by card swipe (block 635) for a predetermined period; for example, the waiting period may be five minutes. If a card swipe is not detected in 5 minutes, the vehicle subsystem returns to a low power condition (block 640).

To determine whether a User is attempting to access the vehicle assigned to him, User ID or staff ID information input from the card reader is compared with User ID or staff ID information previously received and stored in random access memory in the microcontroller at block 645. Access to the vehicle is permitted, for example, by unlocking the vehicle's doors if User ID or staff ID information matches that received from the system control computer and stored in the memory of the microcontroller (block 650). If a User does not input User ID or staff ID information or if the User ID or staff ID information that is input is not correct, within a predetermined period, for example three minutes the vehicle doors do not unlock and both the card reader and MDT return to low power states. The User may be instructed to begin the registration process at the kiosk.

If a User has provided correct User ID or staff ID information, and gained access to the interior of a vehicle, the User's assigned PIN number must be entered into the MDT by, for example, pressing appropriate keys on a key pad connected to the MDT at block 655. A User is permitted to enter the correct sequence a predetermined number of times, for example, five times (block 660). If the correct PIN has not been entered after the specified number of attempts, or three minutes have elapsed since the User began entering a PIN number, the User will be instructed to repeat the registration process at the kiosk, and the doors to the vehicle will lock, after allowing the User a period of time to exit the vehicle (block 665).

The vehicle may be driven after the correct User ID and PIN information are provided, as the ignition is then enabled (block 670). At that time, vehicle status information is transmitted from the vehicle subsystem to the monitoring process of the system control computer as described in more detail below.

Accordingly, preferred embodiments provide multiple levels of security. A first level of security is provided by requiring an ID card with the correct facility information to enter a kiosk. A second level of security is provided by the requirement for proffer of valid User identification to be assigned a vehicle. A third level of security is provided at the vehicle where the User must enter valid identification information (for example, by swiping a card key or token) to gain access to the vehicle. A fourth level of security is provided by the requirement that, once the User enters the vehicle, the User must input a PIN that corresponds to the same User associated with the identification information. Moreover, each of these entries must be made within a preset period of time. These multiple levels of security reduce the risk of unauthorized entry or use of vehicles or theft. Thus, Users are provided with a more secure environment within the vehicles and the vehicle owners and system administrators are provided with a reduced risk of vehicle theft or misuse.

4. Vehicle Operation

During a trip, vehicle status data is transmitted from the vehicle to the vehicle data base. A system operator can monitor the progress of each vehicle in use via a graphical User interface. When a User arrives at a station—though not necessarily the destination specified—parks and exits the vehicle, the User is automatically logged off the system. At the same time, the vehicle is locked and made available for use by others. If the car is parked elsewhere, as during an errand trip, the system still locks the vehicle, but the vehicle remains assigned to the same User. The User can reenter and activate the vehicle by presenting his smart card and PIN number at the vehicle card reader and MDT as previously described.

FIG. 7 illustrates how the system control computer communicates with Users while driving vehicles as necessary, and tracks vehicle use. At block 710 the vehicle subsystem receives a message from the system control computer. For example, a message "please charge your vehicle" may be sent if the system control computer determines that the state of charge is too low to reach the destination vehicle port. A User may reply "Yes", or "No." Other messages exchanged between a vehicle and the central station could include emergency conditions, such as an accident, or a flat tire. The message, once received, is displayed on the MDT of the vehicle subsystem (block 715). The microcontroller is programmed to acknowledge receipt of the messages from the central control computer (block 720). If a message is not acknowledged, the system attendant is alerted to the malfunction. (block 725) and the program halts. If a User reply is detected at block 730, the reply is broadcast to the system control computer at block 735.

If no User reply is detected at block 730, the system control computer interrogates the vehicle at block 740 to determine if the vehicle is parked. If it is determined that the vehicle is not parked, the flow of FIG. 7 repeats.

If a parked state is detected at block 740, a follow-up signal is sent from the microcontroller to set the ignition to an "off" condition at block 745. Using regularly broadcast transponder signals, the system control computer determines whether the vehicle is in a port at block 750. If the vehicle is determined to be at a port, at block 750 in FIG. 7, the system control computer sends a command to the vehicle to end the current User (block 755). The MDT jumps to its initial state, clearing random access memory. At the same time, the card reader and MDT are turned off and the transponder returns to listening mode.

If, however, at block 750 it is determined that the vehicle is not at a port, the vehicle remains assigned to the same User, and the vehicle's doors lock. At block 760 the assigned User follows the same protocol to access the vehicle similar to FIG. 6 except block 610 and 625. The user swipes his smart card to unlock the vehicle and enters his PIN in the MDT. If either the User ID or PIN does not correspond to the assigned User, the vehicle does not respond, but waits for the correct information to be provided.

5. Vehicle Trip and Condition Monitoring

In accordance with further aspects of the present invention, after a User turns on the ignition as discussed above with respect to step 670 of FIG. 6, vehicle status information is transmitted as a radio frequency signal from the vehicle subsystem to the system control computer. This information may include the state of charge of the vehicle (in electrical vehicles) and other operational parameters such as odometer reading, speed, and actual usage or drive time, and whether the vehicle is charging. Vehicle location may be determined from the relative strength of the signals broadcast, according to all known methods. In the presently preferred embodiment, a commercial system using triangulation algorithms is used. Information is transmitted from the vehicle subsystem 18 to a vehicle monitoring process of the system control computer at periodic intervals. In the presently preferred embodiment, the interval is 30 seconds. In this manner, the system control computer may readily track each vehicle in the fleet and allocate vehicles based on information that is current, as described above. In addition, the system control computer may monitor the state of charge of vehicles for purposes of alerting Users and port facility attendants of the need to recharge a vehicle.

A User interface including an MDT (565 in FIG. 5) display similar information to the User, for example, usage time, state of charge or other vehicle parameter such as notices or travel information sent from the system control computer. In addition, the system control computer may send a warning to a vehicle, to inform the User that the state of charge of the vehicle is low or has experienced an unusual fluctuation. The User may be informed to return the vehicle to the nearest port or to simply connect the vehicle to a charger, upon the User's scheduled return.

Through use of vehicle data collected by the central control computer and maintained in data bases to be described, the duration of trips may be predicted. This is especially true when the trips are direct trips, as the distance of the trip will be reasonably uniform. On the other hand, because the distance covered during errand trips will vary, data from such trips is less useful in predicting trip duration. Expected trip duration may be used to determine whether a User has encountered difficulty during a trip. For example, if the arrival of a user at a port is delayed, a system attendant may contact the user by way of the vehicle subsystem.

6. Vehicle Relocation And Staff Action

Staff members may be required to perform different tasks to ensure that vehicles are available for use. More specifically, staff members may have to relocate vehicles if there are not a sufficient number of vehicles at particular ports. Relocation may be accomplished by driving a vehicle or by towing it with another vehicle. Staff members may also have to charge electrically powered vehicles, or to recover a vehicle that is abandoned or is inoperable.

One of the primary purposes of the system is to provide sufficient vehicles at each station to meet the demand of system Users. When the distribution of vehicles at stations become imbalanced, the condition is detected, and vehicles are relocated to correct the imbalance in vehicle distribution.

In the presently preferred embodiment, the algorithm used to determine the need for vehicle relocation is:

CheckNeed[k]=vehcnt+arriving−waiting where Checkneed[k] is a number representing the relative need of station k to have vehicles relocated to it.

for a station to be eligible Checkneed must be below a threshold value "icvmin"

vehcnt=is the number of vehicles available for use at station k;

arriving=number of vehicles in route to station k, as determined by vehicle registration process waiting=number of Users waiting to obtain a vehicle at station k The station with the smallest number of vehicles has priority to receive a relocated vehicle. If Checkneed is not below icvmin for any station, no relocation will occur. In presently preferred embodiments, icvsmin=1.

When the system determines that vehicle relocation is needed, staff members may have to relocate vehicles. Relocation may be accomplished by driving a vehicle or by towing it with another vehicle. Staff members may also have to charge electrically powered vehicles, or to recover a vehicle that is abandoned or is inoperable. To relocate a vehicle by driving, or to charge a vehicle, a staff member swipes his card key at a kiosk. The staff member's card is read by the card reader, and ID information read from the card is sent to the host computer. When the system control computer recognizes the ID information as that of a staff member, the staff member is presented with a menu of potential destinations to which relocation of vehicles is required. The staff member selects a location to which he will relocate a vehicle. The system displays the status of each vehicle, including state of charge and maintenance required, if any. The staff member selects the vehicle to be relocated, and sends his selection to the system control computer. The system control computer sends the ID and PIN of the staff member to the vehicle to be relocated, which is stored in the vehicle microcontroller. To gain access to the vehicle, the staff member swipes his key card past the card reader attached to the vehicle.

To relocate the vehicle by towing, the staff member moves the towing vehicle into position, arranges the towing gear, and drives the towing vehicle to the destination with the towed vehicle attached by towing gear. At the destination, the staff member disconnects the towing gear, and parks the vehicles. Alternatively, a staff member may drive the vehicle requiring relocation. After relocation, the relocated vehicle is available for inclusion into a vehicle search group.

If the vehicle requires charging, after the staff member's ID and PIN are recognized, the staff member enters the vehicle and opens the charge hatch door. The staff member attaches the charging equipment to the receptacle on the vehicle. The vehicle is then charged, and returned to the fleet of available vehicles.

7. Computer System Overview

There are three main components of the computer system in the presently preferred embodiment of the vehicle sharing system: 1) the User registration component; 2) the system management component; and 3) the vehicle component. Computer subsystems (805 in FIG. 8) correspond to the registration component. Computer subsystems are located at a vehicle port to allow Users to input vehicle requests, and staff members to assess the condition and location of vehicles, as required. The management component is embodied as a system control computer (810) which assigns vehicles to Users in response to requests according to a method to be described below, monitors vehicle location and status, and provides an operator interface for intervention as may be required. The vehicle component is embodied as a vehicle subsystem that allows monitoring of vehicle location and status as well as bidirectional communication between the central station and Users operating vehicles.

A. Registration Component

Figure 8:
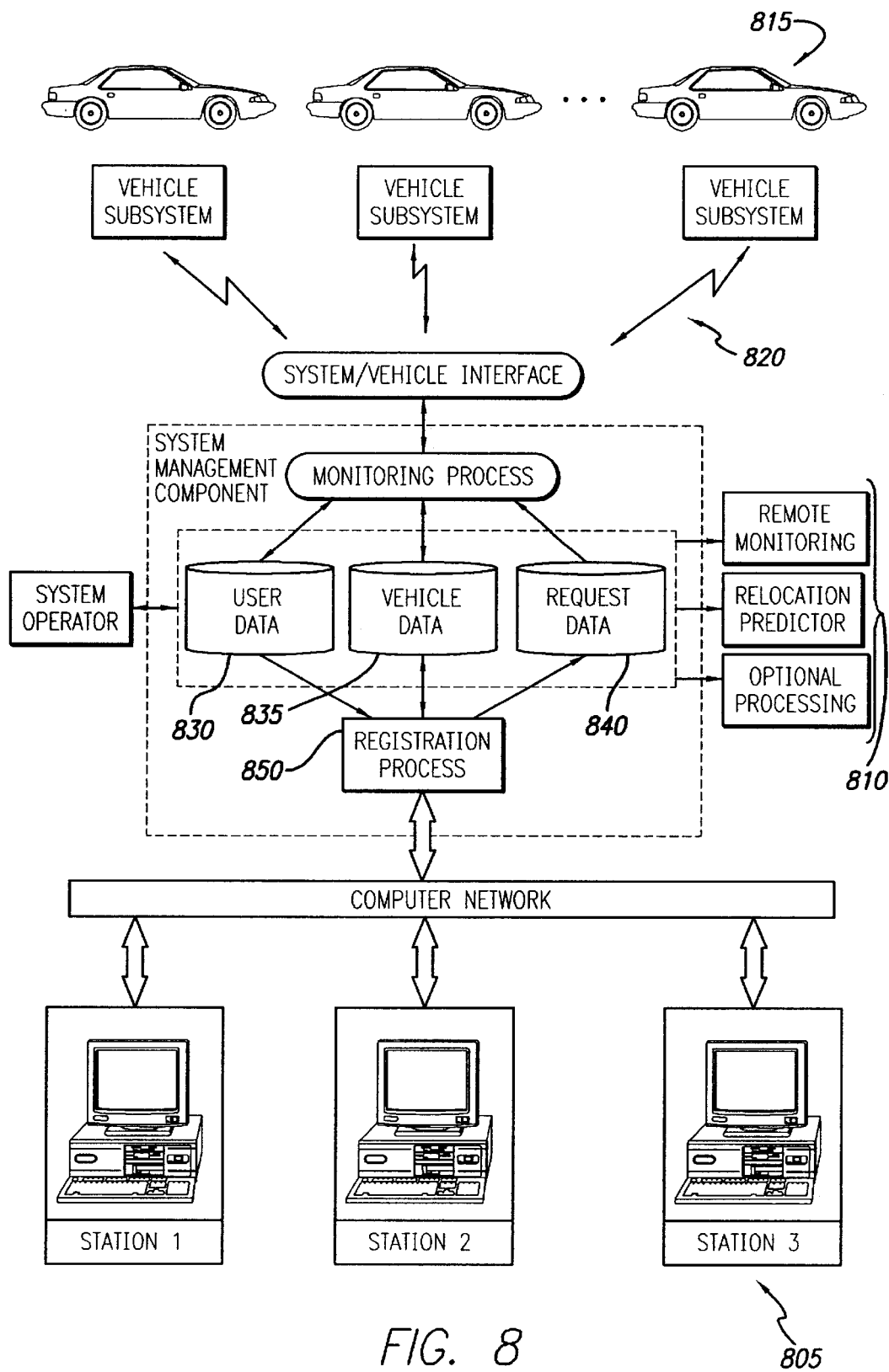
FIG. 8 is a block diagram of the system control computer, including its interaction with other elements of the vehicle sharing system.

As shown in FIG. 8, in preferred embodiments of the inventions the system control computer (810) receives requests for vehicles from computer subsystems (805) which may be located in kiosks. Vehicle request information, including a kiosk identifier, User ID data received by the card reader, and data entered by Users is transmitted to the management component, preferably by way of the Internet using conventional TCP/IP protocol. Alternate embodiments based on dedicated networks are also within the scope of this invention. The User interface of each computer subsystem preferably comprises a client computer, including a keyboard, and other input and output devices such as a card reader for reading smart cards or the like, and a touch screen that is capable of displaying color images. In preferred embodiments the registration process of the system control computer is a web server that uses scripting language routines to communicate with the computer subsystems.

B. Vehicle Subsystem

Each vehicle in the vehicle sharing system is equipped with a vehicle subsystem 815 installed in each vehicle of the vehicle sharing fleet which includes a microcontroller (540 in FIG. 5) capable of monitoring vehicle functions as well as processing and storing data related thereto, a multidisplay terminal (MDT 565 in FIG. 5) for displaying messages to the vehicle from the system control computer, as well as for sending messages to the system control computer, such as entry of PIN numbers, and a transponder that transmits signals for determining vehicle location, as well as vehicle status data.

As shown in FIG. 8, the vehicle subsystem transmits data to and receives messages from the system control computer by, for example, radio frequency transmission, or other wireless link. Received data is converted by the system control computer to machine readable code by an interface (820), which communicates with a monitoring process (825), further described below, in the system control computer. The interface comprises two subsystems: a system interface for providing vehicle location data, and a communications interface for decoding vehicle status information and converting it to a format compatible with the shared system data base.

C. System Control Computer

The system control computer and interfaces are located at the central station. The system control computer is preferably located in a secure environment, such as a secure office building, where access to data relating to User identification codes and other sensitive or private information may be controlled.

The system control computer includes a registration process that communicates with computer subsystems (805). The registration process allocates vehicles in response to requests by Users and staff through computer subsystems. Vehicles are made available to Users in response to requests in accordance with the method already described.

An advantage of the network implementation of the invention is its flexibility. A port vehicle may be placed anywhere that access to the Internet is available. The system is therefore accessible from any computer with access to the Internet. Thus Users of the system may access the system remotely, for example to make reservations for shared vehicles, to determine if vehicles are available at a port, to determine how long a wait there is for a vehicle, to apply for membership in the vehicle sharing system or for other reasons.

The steps carried out by the registration process are described in detail below. The registration process employs information stored in data bases maintained by a monitoring process that runs concurrently on the system control computer in allocating vehicles. These data bases include user data (830), vehicle data (835) and request data (840). The monitoring process updates the data bases with data received from the vehicle and computer subsystems. In preferred embodiments vehicles are polled at 30 second intervals, the interval calculated from the beginning of each trip, and the data bases are updated continuously, as data becomes available. The operation of the system control computer is summarized in FIGS. 9–14, and is described below.

i. Registration Process

Figure 9:
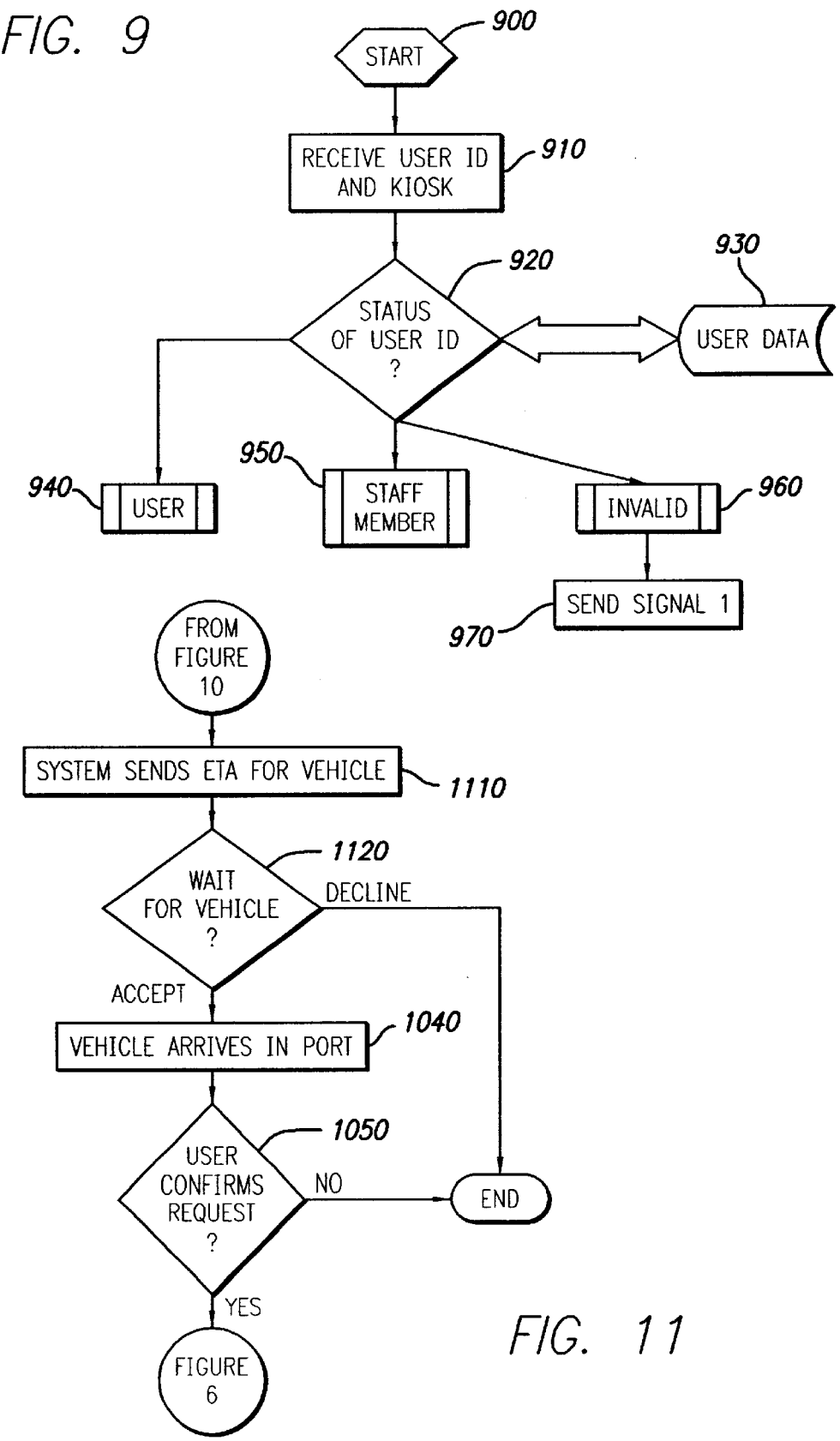
FIG. 9 is a flow chart representation of steps carried out by the central control computer when a user logs into the system to request a vehicle.

At block 910 of FIG. 9, the registration process receives personal ID information together with the identity of the kiosk from which a request is sent. The personal ID information is checked against User data (850) to determine if the request is from an authorized User, and if so, whether the personal ID information is assigned to Staff Member (950) to the more general class of Users (940). If the personal ID information is not recognized, a signal that the personal ID is invalid is sent to the kiosk (block 960). If the User ID is invalid, an appropriate message (Signal 1) is sent to the computer subsystem at block 970. In preferred embodiments, this signal, and others sent from the registration process to the computer subsystems, is a web page. Alternatively, a complete message may be stored at the at the client computer, and called by a signal from the central system computer. In yet another embodiment, the message may be called as a subroutine at the local computer.

Figure 10:
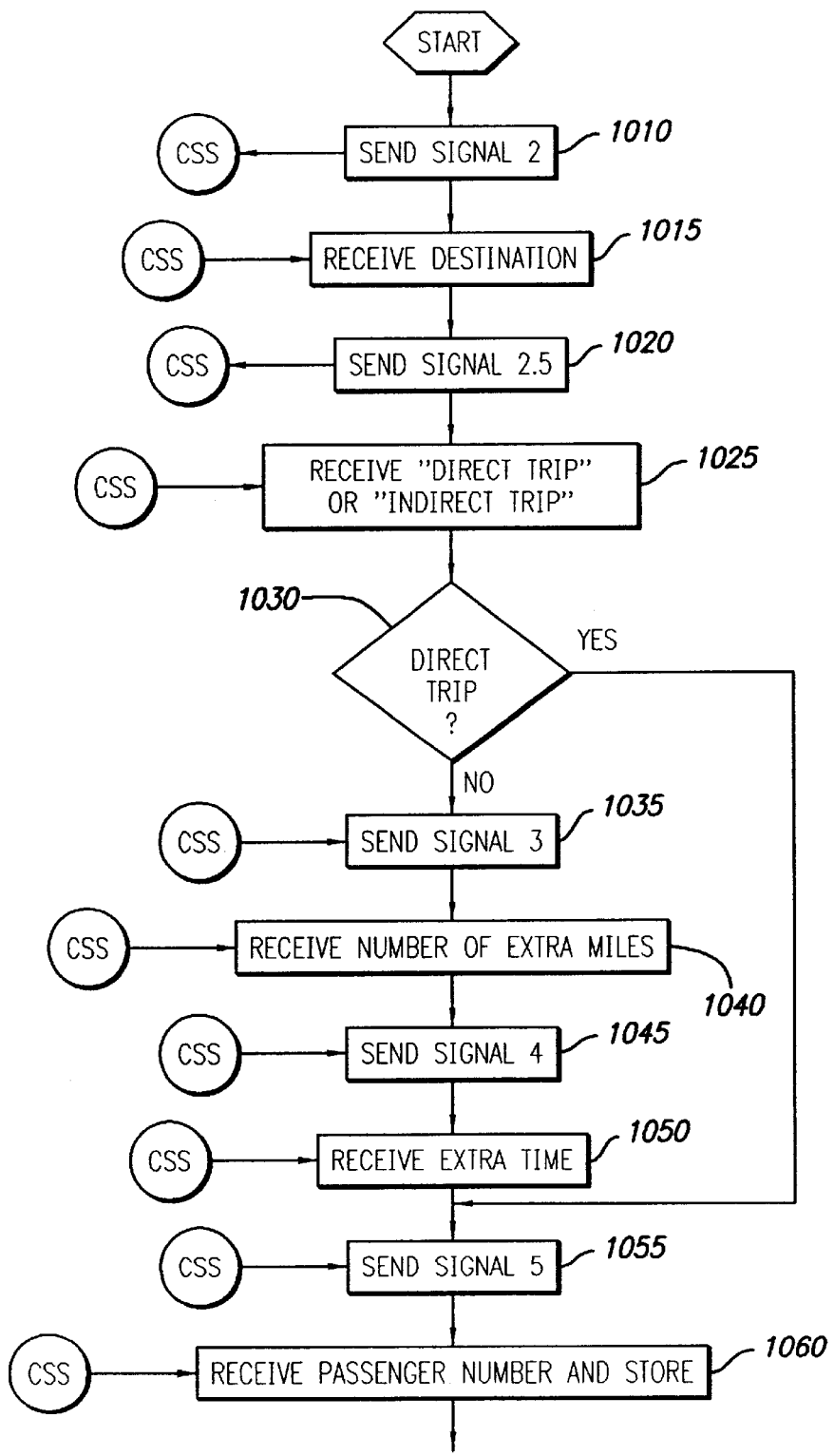
FIG. 10 is a flow chart representation of steps carried out by the system control computer when ID and kiosk information is entered by a User when requesting a vehicle.
Figure 11:
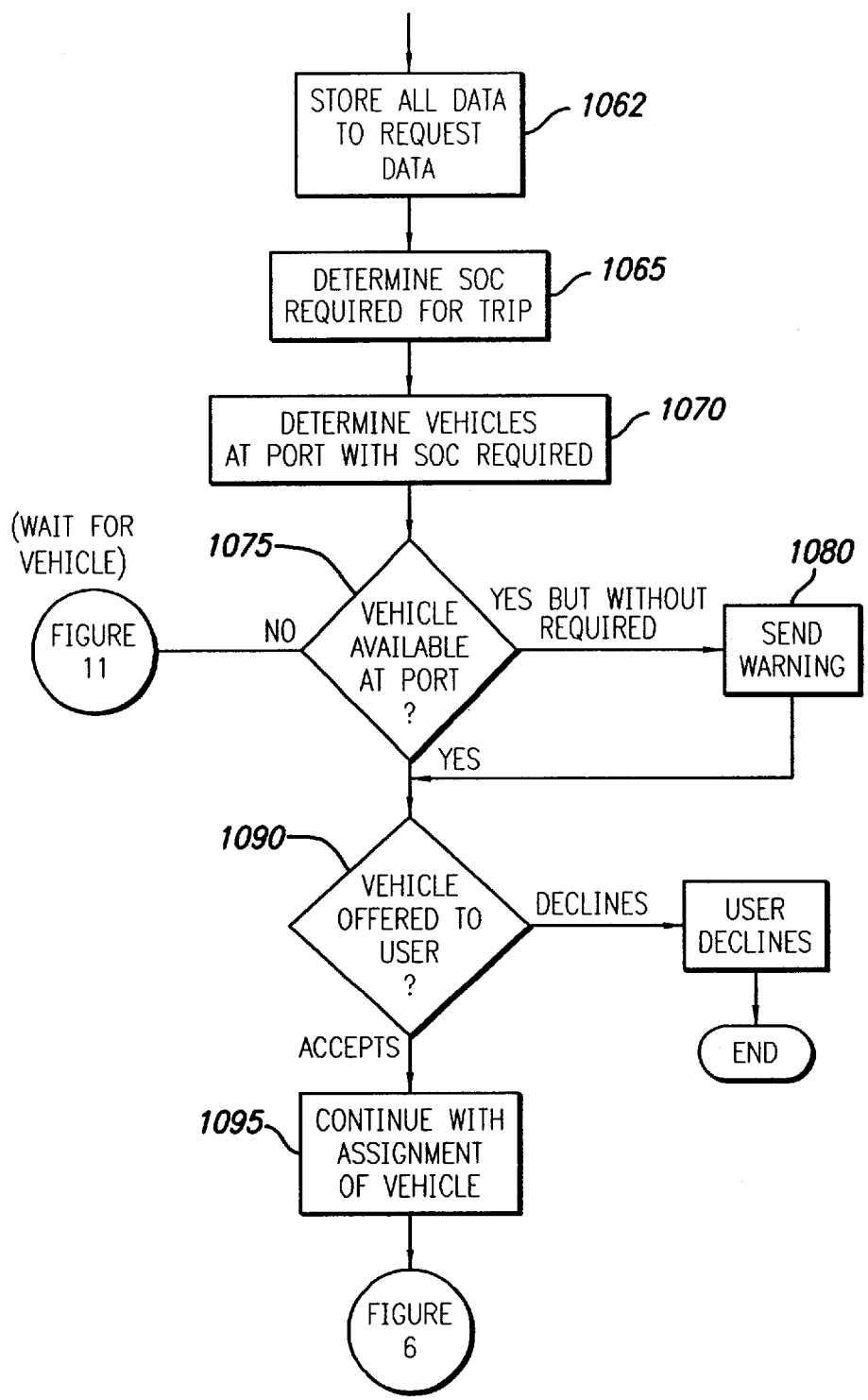
FIG. 11 is a flow chart summarizing program flow when a vehicle is not available.

If the personal ID information received at block 910 is valid and shows that the requester is a User, then program flow branches to the steps shown in FIG. 10. At block 1010, signal 2 is sent to the computer subsystem to request the User to provide the destination to which he wishes to travel. From the destination input by the User (1015) the corresponding distance is determined from information stored in the request data portion of the shared system data base (840). Following receipt of the destination information, signal 2.5 is sent to request whether the trip is to be a Direct Trip or an errand trip, as previously defined (1020). If the response received at block 1025 is that the trip is to be an errand trip, then program flow continues to determine the additional distance and time that the trip is expected to require (1035–1050). If, however the trip is to be a destination trip, that is without intervening stops between the origin and the final destination (1030), then the program flow branches around these inquiries. At block 1055 signal 5 is sent, with the result that the computer subsystem displays a message asking for the number of passengers traveling at block 1060. All of the data obtained from the User is stored to the Request Data at block 1062.

The registration process determines the minimum state of charge required for the distance to be traveled during the requested trip at block 1065, according to the equation:

$$\text{minimum SOC required} = \text{total miles}/\alpha \times 10 + 10,$$

where SOC is the state of charge of a battery that supplies current to a drive motor, and where $\alpha$ is the number of miles that can be driven per 10% of maximum SOC. In the presently preferred embodiment, $\alpha = 6.5$. The result of the calculation is the minimum state of charge required for the trip requested, expressed as a percentage of the total charge the vehicle's battery can accommodate.

From the information obtained, a vehicle allocation algorithm determines which vehicles match the User's request based on current information stored in the vehicle data portion of the shared system data base (FIG. 8, block 835). A vehicle search group is defined for the port from which a User wishes to depart. The vehicle search group includes vehicles located and parked at the port that are not presently allocated to other Users. The vehicle search group may also include vehicles expected to arrive at the port facility within a pre-defined time period. Vehicles scheduled to leave the port for transfer to another port or otherwise are excluded from the vehicle search group. The pre-defined time period is selected to minimize User-waiting time, yet maximize vehicle usage efficiency, by, for example, minimizing energy usage. If there is only one vehicle available with sufficient charge to make the requested trip, that vehicle will be offered at block 1090. If there are two or more vehicles available with sufficient charge, the vehicle with the second greatest state of charge will be offered to the User. In alternative embodiments, all vehicles with sufficient charge may be offered.

If all vehicles have less than the required minimum state of charge, the system will offer the vehicle with the highest state of charge. A warning is provided to the User requesting the vehicle informing the User that the state of charge may be insufficient for the trip requested (block 1080).

While in the presently preferred embodiment, the vehicle fleet is made up of specially modified Honda minivans, in alternative embodiments different types of vehicles may be offered to Users. In such embodiments, the vehicle allocation will take into account the passenger capacity of each vehicle in the vehicle fleet.

If the User accepts the vehicle offered, program flow continues with the assignment of the offered vehicle according to the method summarized in FIG. 6.

In the event that no vehicles are available at the port from which a request is made (block 1075), the system will search for vehicles at other ports that will be arriving at the port in the future. The time to wait for a vehicle is displayed by the computer subsystem (block 1110, FIG. 11) and the User is asked to accept or decline the offered vehicle at block 1120. If the User declines the offer, the program flow ends (1130). If the User accepts the vehicle offered, the vehicle arrives at the port at block 1140. The User is asked to confirm the request at block 1150. Program flow then continues with vehicle assignment, as summarized in FIG. 6. If the User does not confirm the request, program flow ends.

Figure 12:
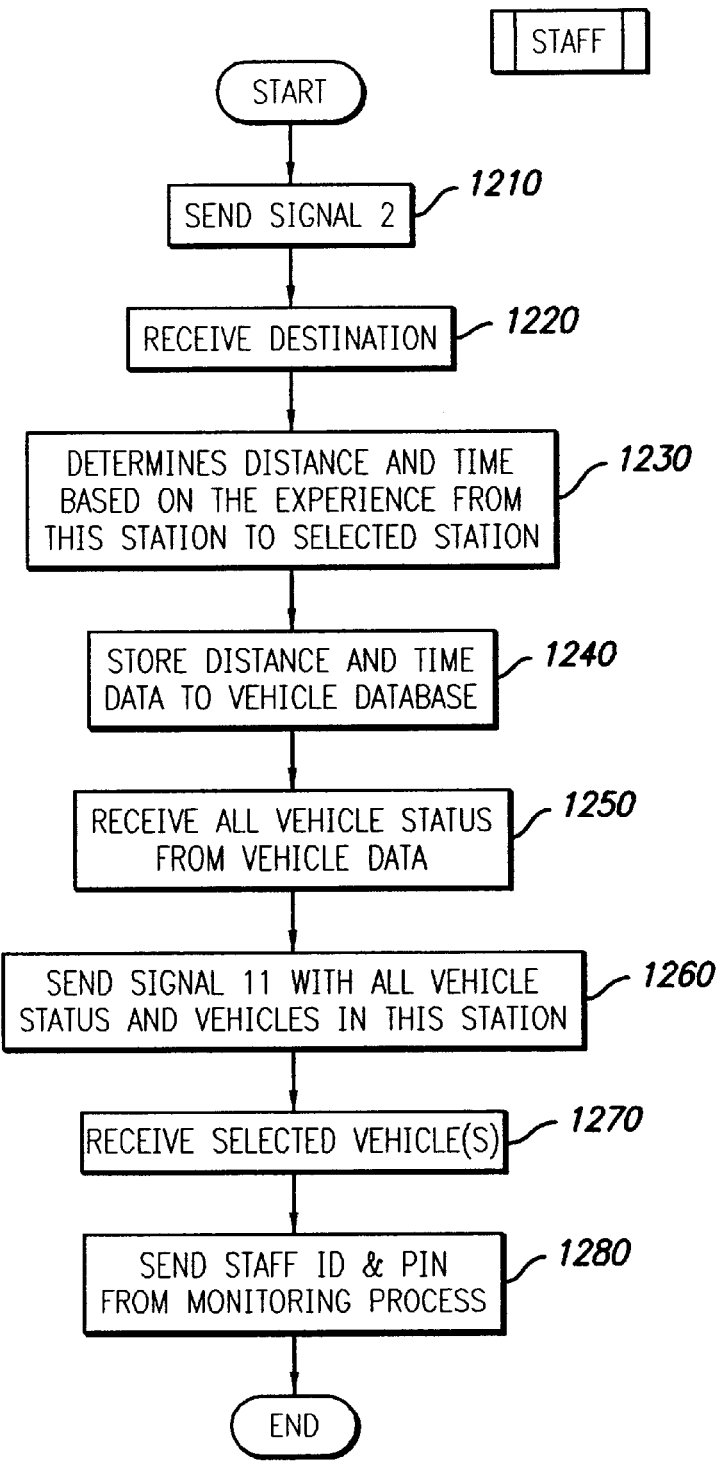
FIG. 12 is flow chart summarizing the steps carried out by the system control computer a staff member logs onto the system to request a vehicle

If the vehicle request is from a Staff Member, then program flow branches to FIG. 12 instead of FIG. 10. At block 1210 signal 2 is sent to the computer subsystem from which the request was received, resulting in display of a message asking the staff member to input his intended destination. The registration process receives the Staff Member's destination from a computer subsystem at a kiosk at block 1220. At block 1230, the registration process determines the distance and time that the requested trip is expected to require based on information previously stored in the User portion of the shared system data (FIG. 8, block 840). The distance and time data is then stored to the request data base at block 1240. At block 1250 the status of all vehicles is retrieved from the vehicle data base. At block 1260, those vehicles in the vehicle search group corresponding to the port from which the request is made, together with their status, is sent to the computer subsystem at the port. The Staff Member then selects a vehicle at block 1270, and at block 1280 the User-ID and PIN of the staff member are sent to the selected vehicle.

In preferred embodiments, when the system determines that vehicle relocation is required, as for example in the algorithm disclosed above, Users may be asked to relocate vehicles. If during vehicle allocation, the monitoring process determines a need for vehicle relocation (block 1310), the User is presented with a short set of questions to determine whether a passenger might drive a vehicle that requires relocation to the passenger's intended destination.

At block 1320, the User is asked whether the trip requested is a destination or an errand trip. If the trip requested is an errand trip, the User is not asked to assist with relocation and the program flow returns to the vehicle assignment method of FIG. 6. If at block 1330 the User responds that only one person will be making the requested trip, then there is no extra driver for vehicle relocation and program flow continues with vehicle assignment according to the method of FIG. 6. If there is a least one passenger in the requested trip (block 1330), then at block 1340 a vehicle is offered for relocation by a passenger. At block 1350 the passenger accepts or declines the offer. If the offer is accepted, the passenger swipes his smart card past the card reader at the computer subsystem, and at block 1370 the appropriate data is sent to the vehicle for assignment to the passenger. At block 1380 the number of the vehicle assigned is sent to the computer subsystem. At block 1280, the passenger either accepts or declines the vehicle offered. The flow of FIG. 11 repeats until there are no additional passengers available to relocate vehicles.

2. Shared System Data Base

A real time data base is used as part of the monitoring component. The data base is implemented as a set of shared tables accessible to both the monitoring and registration processes. The tables contain data from the various subsystems, or from algorithms that use and refine the date.

Data management is handled by commercial data base engines, such as Microsoft Access. The data bases are used for a variety of tasks, including vehicle allocation, calculation of the time and distance a trip requires, as well as tracking and monitoring vehicle status. Other tasks that may be implemented through the data bases include improving the prediction of vehicle arrival times, and determining when vehicle relocation will be necessary.

In the presently preferred embodiment, there are three shared system data base User Data (FIG. 8, 830) includes records of User information and statistics, such as the time required for travel to particular destinations, at different times of the day, as well as a record of the system by registered Users. A request data base (840) contains a record of requests for vehicles and allocation information for each vehicle is maintained. The vehicle data base 835 contains information about vehicle status, including requests that cannot be immediately filled, for lack of a vehicle or in the case that the vehicle is, for instance an electrical vehicle, lack of a vehicle with sufficient battery charge. In an alternate embodiment, the vehicle use data base may be accessed by a User having rights to access the wait request data base from a remote computer, such as the computer subsystem located at a kiosk.

3. Monitoring Process

The monitoring process updates information in the shared system data base using information broadcast from vehicles concerning vehicle status and location. The monitoring process controls and communicates with the vehicle fleet by way of computer and telecommunication equipment.

In the presently preferred embodiment, the monitoring process is implemented on three computers: 1) a data transmission computer that manages communication between the system control computer and the RF (radio frequency) messaging network; 2) a fleet management computer that initiates and monitors messaging and location of the vehicle fleet; and 3) a control computer that generates and records all messages sent to and from the fleet management computer and carries out protocols necessary for system operation. In the presently preferred embodiment the fleet management computer runs commercially available "fleet director" software. It is the integration of the control computer with the fleet management computer that creates a unified shared vehicle system.

Data from the vehicle fleet is constantly monitored. When data is received from a vehicle, the vehicle request data base is immediately updated. The monitoring process also observes the use request portion of the data base. When a use request is submitted by the registration process, the monitoring process prepares the allocated vehicle for use. This includes transmitting the appropriate User ID and PIN information to the vehicle, to insure that the allocated vehicle is made available to the User that submitted the corresponding request.

The monitoring process also keeps track of the distance driven so that the User may be charged for the use made of the vehicle, to warn the User if the distance driven may be in excess of the battery charge available, and to insure that the vehicle is not taken away from the area.

In the presently preferred embodiment, a graphical user interface ("GUI") is also provided so that a system operator may observe the overall system operation. The GUI is configured to allow the system operator to observe the location of each vehicle in a map based environment. The GUI also allows operating data for a selected vehicle to be reviewed. Finally, the GUI allows the system operator to send specific messages to individual vehicles.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while many of the data processing and decision making functions are described above as being performed by the central station, other embodiments may include port facility computer subsystems that are programmed to perform some of such functions. In yet further embodiments, the vehicle subsystem may be programmed to perform some of such functions. Therefore, it is intended that the scope of the invention be limited not by this detailed description, but rather by the claims appended hereto.

What is claimed is:

1. A method for efficient use of vehicles in a vehicle sharing system for sharing a fleet of vehicles pooled in a plurality of ports among a plurality of users with the aid of a computer control system including a central computer system and a plurality of computer subsystems associated with said ports, the method comprising the steps of:
   a) identifying vehicles that should be relocated;
   b) identifying requests for use of vehicles by users, wherein a user requests a trip from a port from which a vehicle should be relocated to a port to which the vehicle should be relocated and states a number of passengers traveling with the user;
   c) determining whether a passenger in the trip identified in step b) above is available to relocate a vehicle identified as a vehicle that should be relocated; and
   d) offering the vehicle to be relocated to the available passenger for relocation.

2. The method for efficient use of vehicles in a vehicle sharing system of claim 1, further comprising the step of proposing that at least one passenger relocate a vehicle that should be relocated.

3. The method for efficient use of vehicles in a vehicle sharing system of claim 1, further comprising the step of logging the number of passengers traveling together to a data base in the central computer system.

4. The method for efficient use of vehicles in a vehicle sharing system of claim 1, further comprising the step of allocating a vehicle with a passenger capacity sufficient for the number of persons traveling together.

5. The method for efficient use of vehicles in a vehicle sharing system of claim 1, wherein the step of identifying vehicles that should be relocated further comprises the steps of:
   a) determining the number of vehicles available for use at a port;
   b) ascertaining whether the number of vehicles available is less that the minimum value known to be appropriate for the port.

6. The method for efficient use of vehicles in a vehicle sharing system of claim 5, wherein the step of determining further comprises the steps of
   a) counting the number of vehicles at a port;
   b) adding the number of vehicles expected to be arriving within a predetermined interval; and
   c) subtracting the number of vehicles from the sum of step a) and step b), the number of vehicles assigned to other users, but remaining in the port.

7. The method for efficient use of vehicles in a vehicle sharing system of claim 1, wherein the requested trip is a direct trip.

8. The method for efficient use of vehicles in a vehicle sharing system of claim 1, wherein the steps are carried out by a registration process running on a system control computer.

9. The method for efficient use of vehicles in a vehicle sharing system of claim 1 further comprising the step of determining the number of passengers traveling together in an allocated vehicle.

* * * * *